US005286954A

United States Patent [19]

Sato et al.

[11] Patent Number: 5,286,954

[45] Date of Patent: Feb. 15, 1994

[54] BANKING TERMINAL HAVING CASH DISPENSER AND AUTOMATIC DEPOSITORY FUNCTIONS

[75] Inventors: Yukie Sato; Tatsushi Miura; Masahiko Wada; Kiyotaka Awatsu, all of Utsunomiya, Japan

[73] Assignee: Fujitsu Limited, Kawasaki, Japan

[21] Appl. No.: 813,386

[22] Filed: Dec. 27, 1991

[30] Foreign Application Priority Data

Dec. 28, 1990 [JP] Japan ........................ 2-408895

[51] Int. Cl.[5] ........................ G06F 15/30

[52] U.S. Cl. ........................ 235/379; 235/382

[58] Field of Search ........................ 235/379, 382, 382.5; 340/825.31

[56] References Cited

U.S. PATENT DOCUMENTS

| | | | |
|---|---|---|---|
| 4,829,296 | 5/1989 | Clark | 235/382 |
| 5,006,698 | 4/1991 | Barakat | 235/382 |
| 5,089,692 | 2/1992 | Tonnesson | 235/382 |
| 5,107,258 | 4/1992 | Soum | 235/382 |

FOREIGN PATENT DOCUMENTS

| | | |
|---|---|---|
| 2-277189A | 11/1990 | Japan . |
| 2-287689A | 11/1990 | Japan . |
| 2-100788A | 12/1990 | Japan . |
| 2-200788A | 12/1990 | Japan . |

*Primary Examiner*—Harold Pitts

*Attorney, Agent, or Firm*—Staas & Halsey

[57] ABSTRACT

A banking terminal includes a plurality of locks which are provided at predetermined parts of the banking terminal and unlocked in response to instruction signals, a memory part for storing a table of attribute data in correspondence with one or a plurality of locks which are to be unlocked, a card reader for reading information from a identification card which prestores at least attribute data, and a control part for automatically unlocking one or a plurality of predetermined locks out of the locks by supplying instruction signals based on the attribute data read from the identification card by the card reader by referring to the table of the memory part.

12 Claims, 25 Drawing Sheets

FIG. 12

| CODE | POSITION | |
|---|---|---|
| a | 1 | ID MARK |
| 9 | 1 | BANK APPROVAL |
| | 3 ~15 | OPERATOR ID |
| 0000 | 16 ~19 | UNUSED |
| | 20 ~21 | OPERATOR LEVEL |
| | 22 ~25 | SPARE 1 |
| | 26 ~29 | PASSWORD |
| 0001 | 30 ~33 | BANK ARBITRARY FIELD |
| | : | : |
| | 45 ~48 | SPARE 2 |
| | : | : |
| ALL 0 | 65 ~72 | UNUSED |

FIG. 13

| ITEM | POSSITION | LENGTH |
|---|---|---|
| OPERATOR ID | 3 | 12 |
| PASSWORD | 26 | 4 |
| OPERATOR LEVEL | 20 | 2 |
| SPARE 1 | 22 | 4 |
| SPARE 2 | 45 | 4 |
| | : | : |
| SPARE n | n n | n |

FIG. 14

| ITEM | POSITION | LENGTH | DATA |
|---|---|---|---|
| ID MARK | 1 | 2 | a |
| BANK APPROVAL | 2 | 1 | 9 |
| UNUSED | 16 | 4 | 0000 |
| BANK ARBITRARY FIELD | 30 | 4 | 0001 |
| UNUSED | 65 | 8 | ALL 0 |

FIG. 17

| ITEM | OPERATOR ID | PASSWORD | OPERATOR LEVEL | BANK NO. | BRANCH NO. | OPERATION LEVEL |
|---|---|---|---|---|---|---|
| 1 | 0000001 | FFFF | 10 (HEAD) | 0012 | 0001 | MASTER |
| 2 | 0000002 | FFFF | 20 (ASSISTANT HEAD) | 0012 | 0001 | MASTER |
| 3 | 1000010 | 1234 | 30 (MANAGING) | 0012 | 0001 | CASH MANAGEMENT |
| | 1000001 | 0111 | 40 (GENERAL) | 0012 | 0001 | CUSTOMER SERVICE |
| | 2000000 | 9999 | 50 (PART-TIME) | 0012 | 0001 | SUPPLY MEDIUM |
| | 9999003 | 1234 | 60 (THIRD PARTY) | 0012 | FFFF | SUPPLY CASH |
| ⋮ | ⋮ | ⋮ | ⋮ | ⋮ | ⋮ | ⋮ |

FIG. 18

| OPERATOR LEVEL | CONTENT | UNLOCKING LOCKS |
|---|---|---|
| 00 | MASTER | ALL LOCKS |
| 10 | HEAD | ALL LOCKS |
| 20 | ASSISTANT HEAD | ---- |
| 30 | MANAGING | ---- |
| 40 | GENERAL | ---- |
| 50 | PART-TIME | L19, L3 |
| 60 | THIRD PARTY | L19, L13~L16 |
| 90 | MAINTENANCE PERSON | ---- |

FIG. 20

| OPERATION LEVEL | AUTHORIZED OPERATION | LOCKS WHICH ARE UNLOCKED |
|---|---|---|
| MASTER LEVEL | ALL OPERATIONS | ALL LOCKS |
| CASH MANAGEMENT LEVEL | OPERATIONS OTHER THAN REGISTRATION | ALL LOCKS |
| CASH SUPPLY LEVEL | CHANGE CASH CASSETTE (NO DIRECT ACCESS POSSIBLE TO CASH, CARD, PASSBOOK, ETC.) | L8, L13, L14, L16, L19 |
| MEDUM SUPPLY LEVEL | SUPPLY PASSBOOK, PAPER CARD, RECEIPT & JOURNAL | L4, L5, L19 |
| CUSTOMER SERVICE LEVEL | REMOVE FAILURE, RETURN FORGOTTEN CASH & MEDIUM | L1, L2, L3, L6, L9, L12 L15, L19 |
| EQUIPMENT SUPERVISION LEVEL | START EQUIPMENT, MANAGE END & MONITOR STATE | L19 |
| MAINTENANCE LEVEL | MAINTENANCE | L3, L9, L15, L19, L20 |

BANKING TERMINAL HAVING CASH DISPENSER AND AUTOMATIC DEPOSITORY FUNCTIONS

BACKGROUND OF THE INVENTION

The present invention generally relates to banking terminals, and more particularly to a banking terminal which has cash dispenser and automatic depository functions and is provided with locks which need to be opened when making access to predetermined parts of the banking terminal.

The banking terminal can make various transactions requested by a customer without the presence of a bank clerk. The transaction may deposit and draw out money to and from the customer's own account using a cashing card or a passbook, or remit to an account using a remittance card or cash. Accordingly, the banking terminal always accommodates cash which is to be dispensed and cash which is deposited, and for safety reasons, locks are provided at specific parts of the banking terminal so that the handling of cash is restricted. In addition, since it is inconvenient for the customer if the banking terminal stops operating, there is a need to prevent erroneous operation or access into the banking terminal. For this reason, locks are provided at predetermined parts of the banking terminal so that an unauthorized person cannot make access into the banking terminal, and the locks are opened by an authorized person only when necessary.

FIG. 1 shows a perspective view of a banking terminal, and FIG. 2 shows a rear view of this banking terminal when a rear door is opened.

In FIG. 1, an indicator 1*a* indicates whether the banking terminal is operating or stopped, and an indicator 1*b* indicates the task such as deposit, enter accounts, and remit. An opening 1*c* is provided to receive a card which is inserted, and an opening 1*d* is provided to receive a passbook which is inserted. An opening 1*e* is provided to input and output coins, and an opening 1*f* is provided to input and output bills. A customer operation part 1*g* integrally has a cathode ray tube (CRT) and a touch-panel. This customer operation part 1*g* is used to display operating instructions to the customer, display the dispensed amount, input a personal identification number, input the amount of money and the like. A front door 1*h* is provided at the lower front part of the banking terminal.

In FIG. 2, a card reader-writer image printer (CIP) 2*a* make read and write operations with respect to a magnetic card, a remittance card or the like and also prints contents of the transaction on a journal paper, a receipt paper or the like. A passbook printer (PPR) 2*b* carries pit read and write operations with respect to a passbook and also prints the contents of the transaction on the passbook, an input-output slip or the like. A bill recycle unit (BRU) 2*c* carries out processes such as discriminating counterfeit bills, arranging front and back sides of the bills, accommodating bills by the amount, and paying out bills. A coin recycle unit (CRU) 2*d* carries out processes such as discriminating counterfeit coins, accommodating coins in a safe, and paying out coins. A maintenance operation panel (MOP) 2*e* includes a liquid crystal display (LCD), a keyboard and the like, and is used to process information from a clerk that is necessary to carry out the daily operation of the banking terminal and to smoothly cope with a failure. A rear door 2*f* is provided on the rear of the banking terminal. The journal paper and the receipt paper of the CIP part are set in a CIP supply unit 2*g*, and the CIP supply unit 2*g* automatically switches to the new journal paper when the journal paper runs out in the CIP paper, for example. A passbook issuing unit 2*h* issues a passbook and an input-output slip.

For safety reasons, locks 3*a* through 3*h* are provided at predetermined parts of the banking terminal.

(1) Door keys for the locks 3*a* and 3*b* are required to respectively open and close the front and rear doors 1*h* and 2*f*.

(2) A blue key for the locks 3*c* and 3*d* is required to insert and extract cash cassettes to and from the respective recycle units 2*c* and 2*d*.

(3) A red key for the locks 3*e* and 3*f* is required to directly handle the cash.

(4) A clerk key for the lock 3*g* is required to switch the customer operation screen to a failure information display screen.

(5) A control key for the lock 3*h* is required to switch the mode between the operation mode and the test mode in the MOP 2*e*.

The keys described above in (1) through 5) are used to unlock and lock the corresponding locks 3*a* through 3*h*.

Not all bank clerks can freely use the above described keys. The keys which may be used by each bank clerk is usually dependent on his position, and each bank clerk has a number of keys required to carry out his duties. Hence, the authorized clerks use the appropriate keys to unlock the locks to collect or accommodate the cash, supply or remove the journal paper or receipt paper, attend to the maintenance and the like.

For example, a cashier of a certain position can manage cash, and thus carries the key for the lock 3*b*, the blue key and the red key. When collecting cash from or accommodating cash in the cash cassette, the rear door 2*f* is opened by use of the key for the lock 3*b*, and the blue key is then used to remove the cash cassette from the bill recycle unit 2*c* or the coin recycle unit 2*d*. Thereafter, the red key is used to open the cash cassette to collect or accommodate the cash.

Accordingly, a plurality of keys exist for one banking terminal. Moreover, the keys which may be used are not only different for each branch office of the bank, but are also different depending on the position of the clerks within the bank. Furthermore, it is necessary to use a plurality of keys to carry out a predetermined operation such as collecting and accommodating the cash. For this reason, the following problems exist in the conventional banking terminal.

First, the number and the kinds of keys are large, thereby making it troublesome to manage the keys.

Second, it is difficult to specify the person who used the keys because the keys are used by many people, and this is undesirable from the point of view of the security of the system.

Third, a plurality of keys are required to make one operation such as handling the cash, and the operation becomes complex.

Fourth, the cost of the system becomes high because of the need to provide a large number and kinds of keys.

Fifth, it is desirable to finely restrict the operation of the clerks depending on his positions and/or duties, but it is virtually impossible to realize such a restriction because a lock and its key becomes necessary at many parts of the banking terminal.

Sixth, from the point of view of improving the security of the system, it becomes necessary to use a large number of keys, but there is a limit to increasing the number of keys from the practical point of view.

SUMMARY OF THE INVENTION

Accordingly, it is a general object of the present invention to provide a novel and useful banking terminal in which the problems described above are eliminated.

Another and more specific object of the present invention is to provide a banking terminal comprising a plurality of locks provided at predetermined parts of the banking terminal and unlocked in response to instruction signals, memory means for storing a table of attribute data in correspondence with one or a plurality of locks which are to be unlocked, reading means for reading information from a identification card which prestores at least attribute data, and control means, coupled to the locks, the memory means and the reading means, for automatically unlocking one or a plurality of predetermined locks out of the locks by supplying instruction signals based on the attribute data read from the identification card by the reading means by referring to the table of the memory means. According to the banking terminal of the present invention, no keys are necessary and there is no need to make a complex key management. In addition, the locks can be unlocked by a simple operation, and the operation of the banking terminal can be finely controlled depending on the operator level, the operation level and the like. It is easy to cope with the situation even if the number of locks becomes large.

Other objects and further features of the present invention will be apparent from the following detailed description when read in conjunction with the accompanying drawings.

BRIEF DESCRIPTION OF THE DRAWINGS

FIG. 12 is a diagram for explaining an ID card format;

FIG. 13 is a diagram for explaining input data for registering the I card format;

FIG. 14 is a diagram for explaining a fixed check data file;

FIG. 17 is a diagram for explaining an operator information file;

FIG. 18 is a diagram for explaining a table of operator level and electromagnetic locks to be unlocked;

FIG. 20 is a diagram for explaining a table of operation level and electromagnetic locks to be unlocked;

DESCRIPTION OF THE PREFERRED EMBODIMENTS

Figure 1:
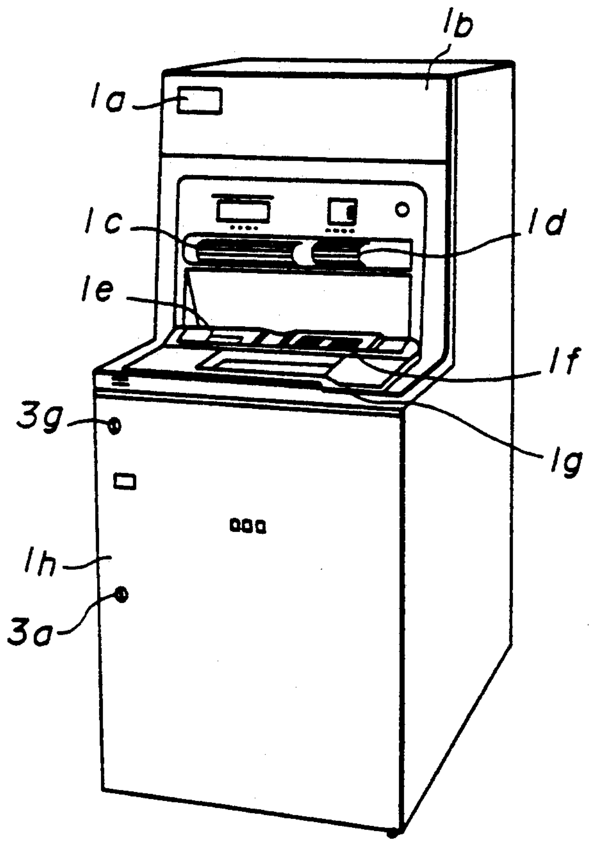
FIG. 1 is a perspective view showing a banking terminal.
Figure 2:
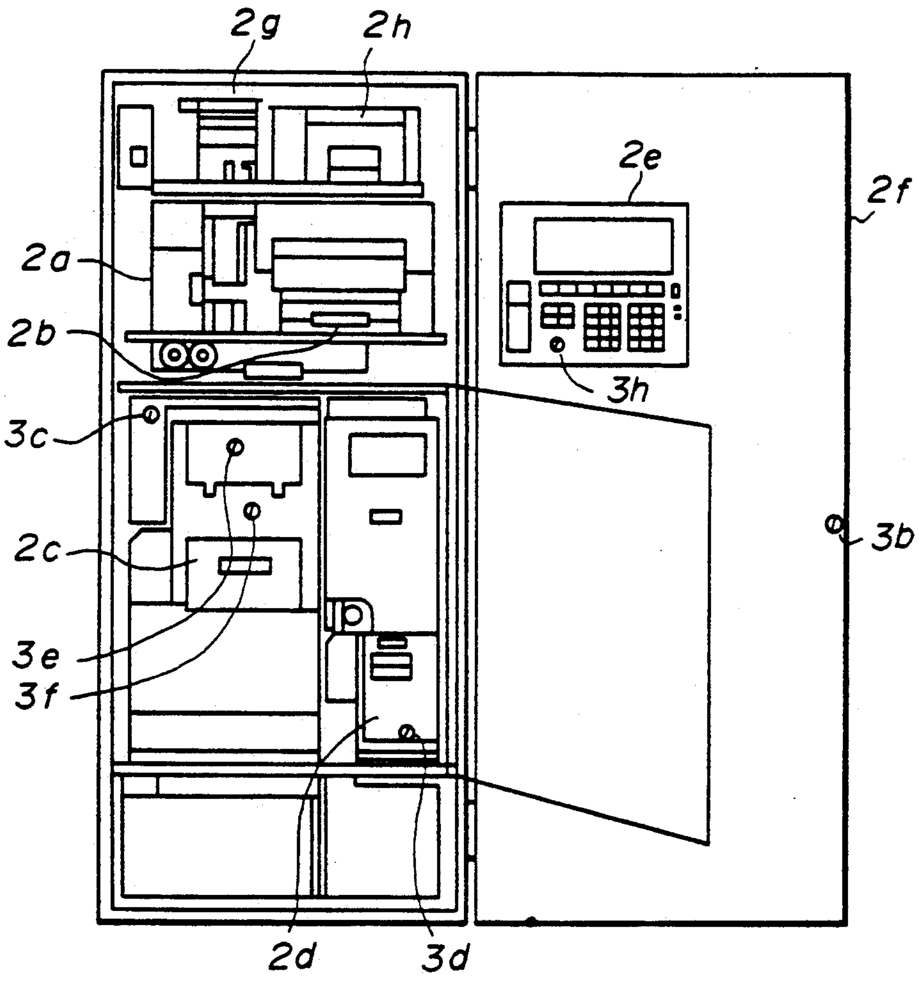
FIG. 2 is a read view showing the banking terminal shown in FIG. 1 with a rear door opened.
Figure 3:
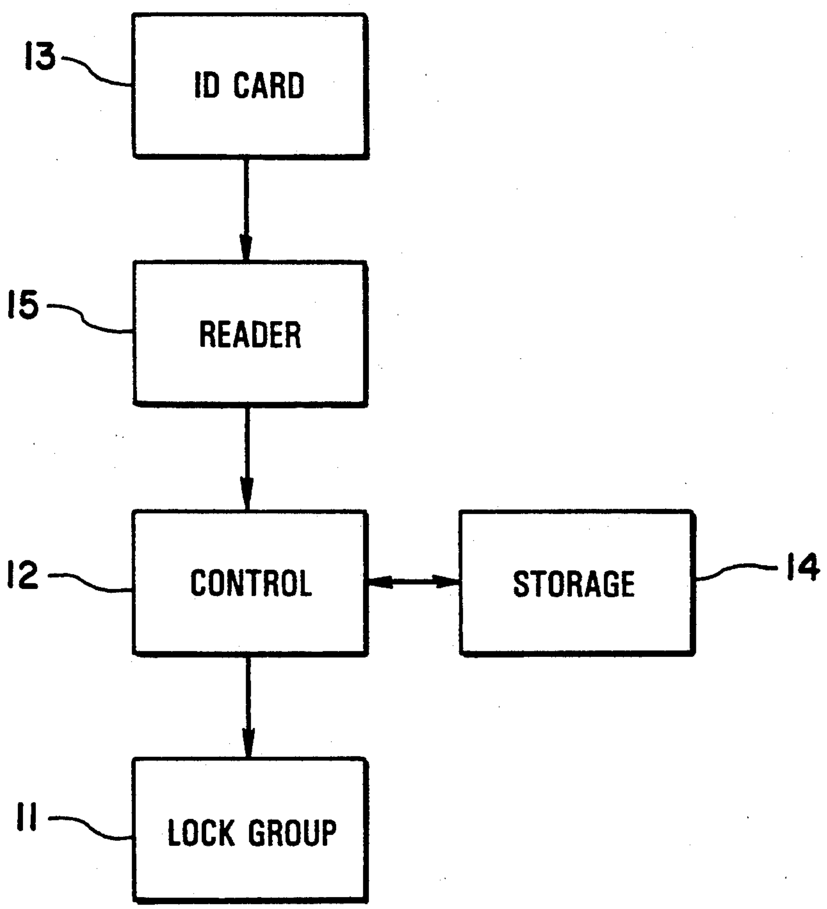
FIG. 3 is a system block diagram for explaining the operating principle of a banking terminal according to the present invention.

First, a description will be given of the operating principle of a banking terminal according to the present invention, by referring to FIG. 3. A banking terminal shown in FIG. 3 generally includes an electromagnetic lock group 11 which is made up of a plurality of electromagnetic locks which automatically open and close in response to instructions, a control part 12 for controlling the electromagnetic lock group 11, a storage 14 which stores the correspondence of attribute data and at least one electromagnetic lock in the form of a table, and an ID card reader 15 which reads personal information and the attribute data from the an identification (ID) card 13. The ID card 13 stores the attribute data such as operator level and operation level in addition to the personal information. One ID card 13 is carried by each bank clerk. The electromagnetic locks of the electromagnetic lock group 11 are provided at predetermined parts of the banking terminal.

When a bank clerk wishes to carry out an operation he is authorized to perform, his ID card 13 is set in the ID card reader 15 and the data written in this ID card 13 is read by the ID card reader 15. The control part 12 looks up in the storage 14 one or a plurality of predetermined locks corresponding to the attribute data read out from the ID card 13, and unlocks the predetermined electromagnetic locks. No keys are used to unlock the predetermined electromagnetic locks. For this reason, it is unnecessary to manage a large number of keys, and the electromagnetic locks which need to be unlocked can be unlocked by a simple operation. In addition, it is possible to finely restrict the operation of the clerks depending on his positions and/or duties, and such a restriction can be realized even when a large number of electromagnetic locks become necessary in the banking terminal.

It is possible to make a password correspond to one ID card 13. In this case, the input of the password may be considered as one of the conditions for unlocking the predetermined electromagnetic locks. On the other hand, the information stored in each ID card 13 may be registered in advance as operator files within the banking terminal. In this latter case, the match of predetermined data of the information read from the ID card 13 by the ID card reader 15 and the corresponding data within the registered operator file may be considered as one of the conditions for unlocking the predetermined electromagnetic locks. In these cases, the security of the system is improved in that unauthorized persons are positively prevented from unlocking the predetermined electromagnetic locks.

Furthermore, the operation history of the banking terminal using the ID card 13 may be stored in the banking terminal and output when needed. In this case, it is also possible to improve the security of the system.

Figure 4:
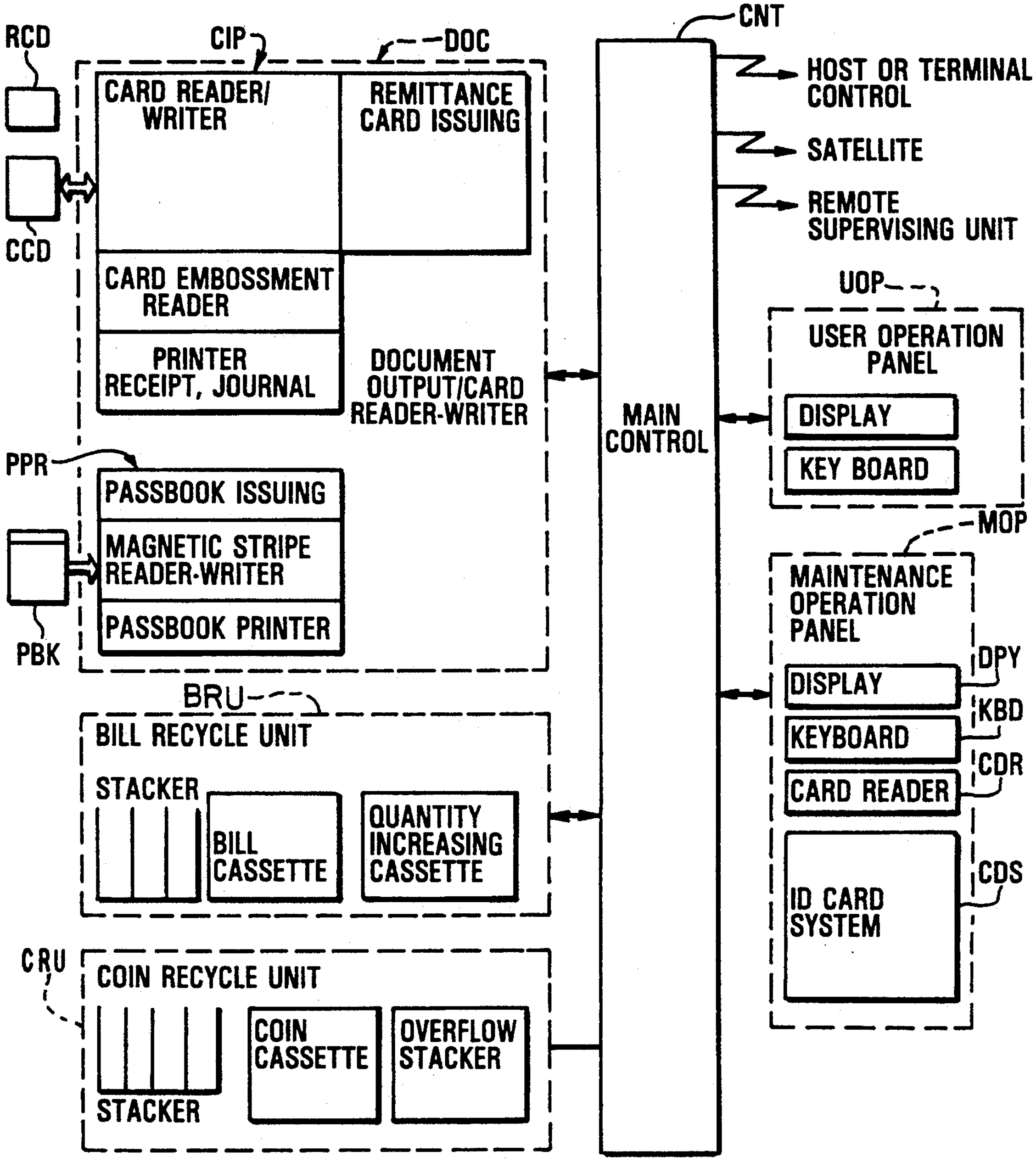
FIG. 4 is a system block diagram generally showing a first embodiment of the banking terminal according to the present invention.

Next, a description will be given of a first embodiment of the banking terminal according to the present invention, by referring to FIG. 4. FIG. 4 generally shows the first embodiment of the banking terminal.

General Construction of the Banking Terminal:

In FIG. 4, a main control part CNT controls the entire banking terminal, and also makes data communication with a host, a terminal equipment, a satellite, a remote supervising unit and the like. A document output/card reader-writer DOC is provided with a card reader-writer and image reader-printer (hereinafter simply referred to as a card unit) CIP, and a passbook printer (hereinafter referred to as a passbook unit) PPR.

The card unit CIP makes a read operation and a write operation with respect to a cashing card (magnetic card) CCD and a remittance card RCD. In addition, the card unit CIP carries out processes such as issuing remittance cards and printing transaction contents on the journal paper and receipt paper. The card unit CIP includes a card reader-writer part, a card embossment reader part, a printer part, a remittance card issuing part and the like. The passbook unit PPR carries out processes such as making a read operation and a write operation with respect to a passbook PBK, issuing new passbooks and printing transaction contents on the passbook and input-output slip. The passbook unit PPR includes a passbook magnetic stripe reader-writer part, a passbook printer part, a passbook issuing part and the like.

A bill recycle unit BRU carries out processes such as discriminating counterfeit bills from the deposited bills, arranging the front and back sides of the bills, accommodating bills by the amount, and paying out bills. The bill recycle unit BRU includes a bill cassett (intelligent clerk safe) which is used to set and collect bills, an intelligent quantity increasing cassette, three stackers and the like. The stackers are used to accommodate by the amount bills which are deposited and bills which are supplied from the bill cassette, and for paying out bills by the amount.

A coin recycle unit CRU carries out processes such as discriminating counterfeit coins, accommodating coins in a safe, and paying out coins. The coin recycle unit CRU includes a coin cassette for accommodating deposited coins and coins to be paid out, stackers for accommodating coins supplied from the coin cassette and for supplying coins by the amount when paying out coins, and an overflow stacker for temporarily accommodating the coins in order to accommodate the coins within the coin cassette into the stacker and to collect the coins into the coin cassette from the stacker.

A user operation panel UOP includes a touch keyboard, and a display part for displaying operating instructions to the customer (user), the amount paid out and the like. This display part also displays the personal ID number and the amount when inputting the personal ID number and the amount.

A maintenance operation panel MOP has various functions including the function of processing information from a clerk that is necessary to carry out the daily operation of the banking terminal and to smoothly cope with a failure, and the function of controlling the locking and unlocking of electromagnetic locks which are provided at predetermined parts of the banking terminal. The maintenance operation panel MOP includes a liquid crystal display part DPY, a keyboard KBD, a card reader CDR, and ID card system CDS and the like.

The ID card system CD stores corresponding relationships of each operator level and one or more electromagnetic locks. In addition, the ID card system CDS records predetermined operator level in addition to the personal information on the ID card which is carried by each individual. When the ID card is inserted into the card reader CDR, the ID card system obtains from the above described corresponding relationships specific electromagnetic locks which correspond to the operator level which is read from the ID card, and unlocks the specific electromagnetic locks.

ID Card System

Figure 5:
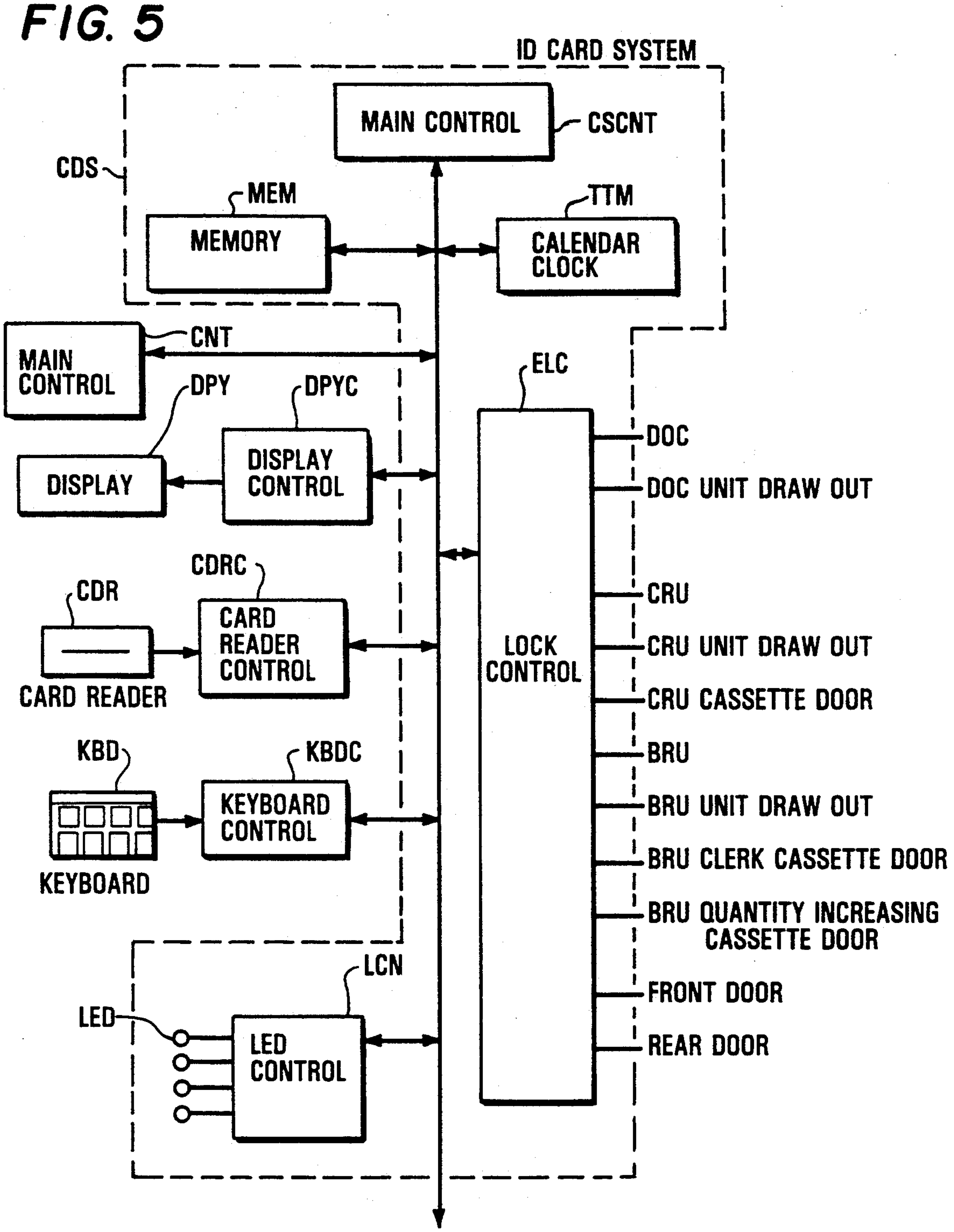
FIG. 5 is a system block diagram showing an embodiment of an ID card system shown in FIG. 4.

FIG. 5 shows an embodiment of the ID card system CDS. In FIG. 5, those parts which are the same as those corresponding parts in FIG. 4 are designated by the same reference numerals.

The ID card system CDS shown in FIG. 5 includes an ID card system main control part CSCNT having a computer structure, a memory part MEM for storing various data, a calendar clock TIM for monitoring the year, month, day and time, an electromagnetic lock control part ELC for controlling locking and unlocking of the electromagnetic locks, a light emitting diode part LED for indicating the unlocked electromagnetic locks, and an LED control part LCN for controlling ON/OFF state of each light emitting diode of the light emitting diode part LED. The memory part MEM stores at least one card format which will be described later, operator information files, a table containing the corresponding relationships of each operator level and the electromagnetic locks and the like.

Figure 6:
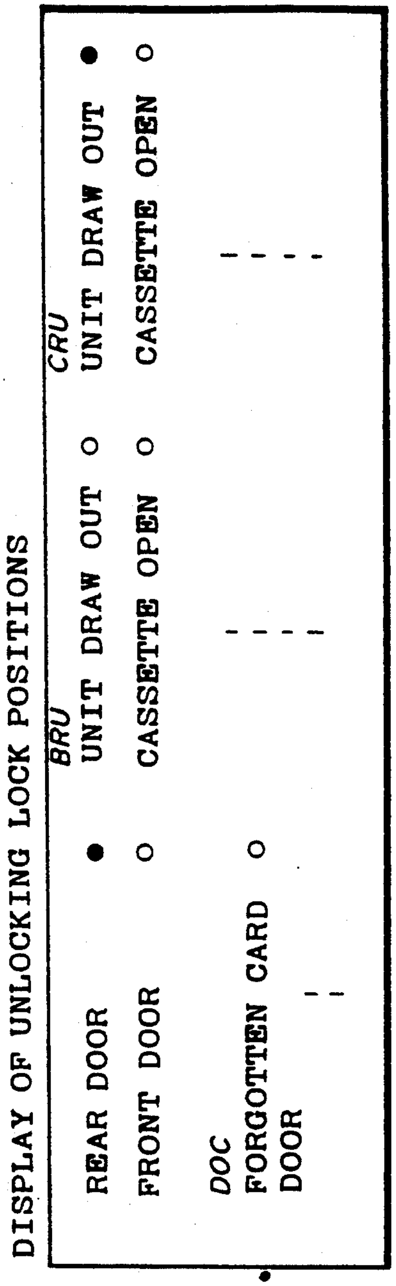
FIG. 6 is a diagram for explaining a light emitting diode part of the ID card system shown in FIG. 5.

As shown in FIG. 6, the light emitting diodes of the light emitting diode part LED are provided in correspondence with each of the electromagnetic locks provided within the banking terminal. Each light emitting diode turns ON to indicate the position of the unlocked electromagnetic lock. In FIG. 6, black circles indicate the light emitting diodes which are ON, and in this case, it is indicated that the electromagnetic locks of the rear door and the coin recycle unit CRU are unlocked.

Returning to the description of FIG. 5, FIG. 5 also shows parts associated with the ID card system CDS. The associated parts include the main control part CNT, a display part DPY of the maintenance operation panel MOP, a display control part DPY, the card reader CDR, a card reader control part CDRC, the keyboard KBD and a keyboard control part KBDC.

Positions of the Electromagnetic Locks

Figure 7:
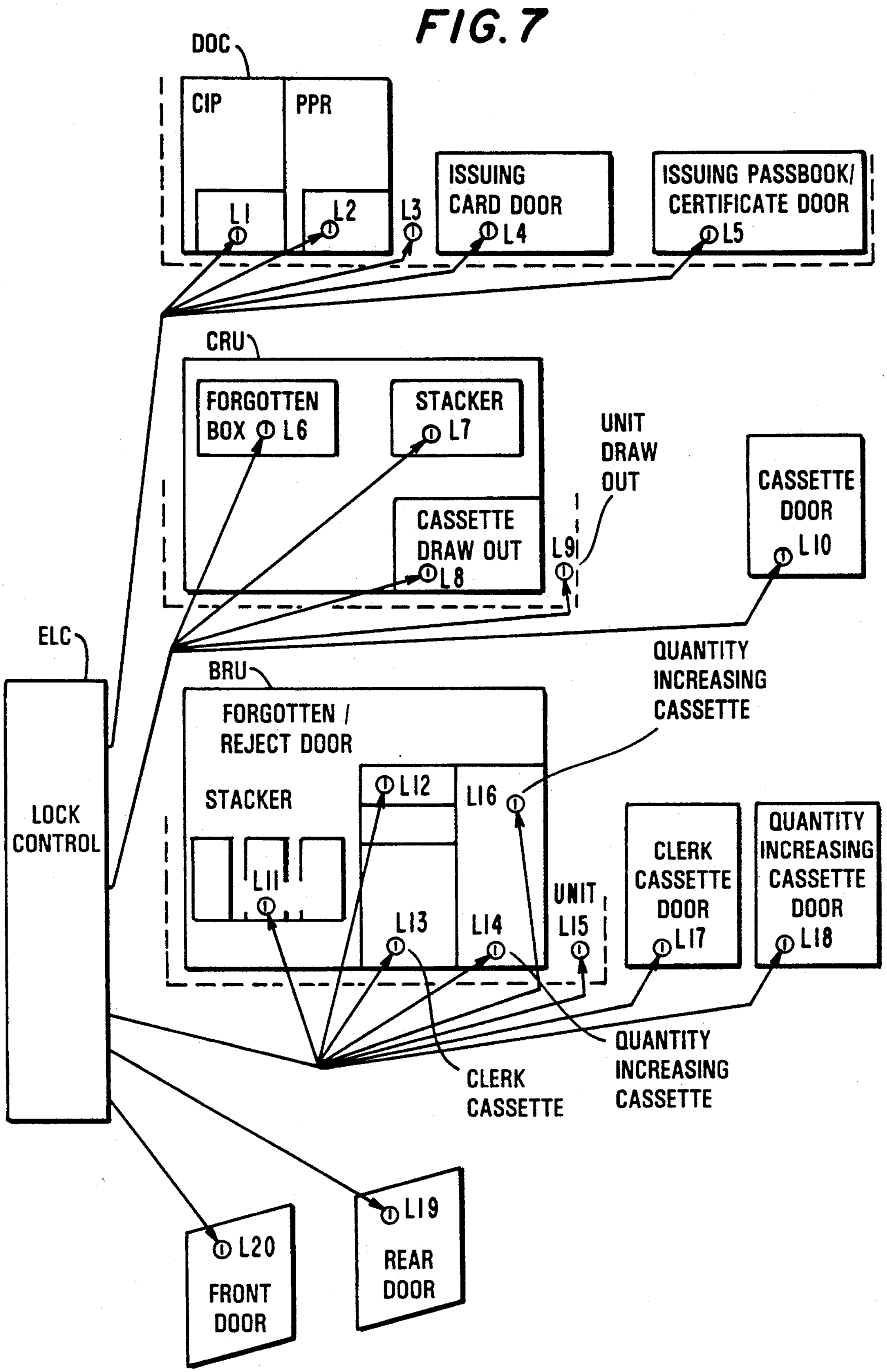
FIG. 7 is a diagram for explaining the positions of electromagnetic locks.

FIG. 7 is a diagram for explaining the positions of the electromagnetic locks. The conventional locks are replaced by the electromagnetic locks, and in addition, the electromagnetic locks are newly provided at parts of the banking terminal where the restriction of the operation is necessary.

First, electromagnetic locks L1 through L5 are provided in the document output/card reader-writer DOC. The lock L1 is unlocked to enable access through a forgotten card door, the lock L2 is unlocked to enable access through a forgotten passbook door, the lock L3 is unlocked to enable a unit to be drawn out, the lock L4 is unlocked to enable access through a issuing card door, and the lock L5 is unlocked to enable access through a issuing passbook/certificate door.

Second, electromagnetic locks L6 through L10 are provided in the coin recycle unit CRU. The lock L6 is unlocked to enable access to a forgotten box, the lock L7 is unlocked to enable access to a stacker, the lock L8 is unlocked to enable a cassette to be drawn out, the lock L9 is unlocked to enable a unit to be drawn out, and the lock L10 is unlocked to enable access through a cassette door.

Third, electromagnetic locks L11 through L18 are provided in the bill recycle unit BRU. The lock L11 is unlocked to enable access to a stacker, the lock L12 is unlocked to enable access through a forgotten/reject door, the lock L13 is unlocked to enable pivotting/extraction of a clerk cassette, the lock L14 is unlocked to enable extraction of a quantity increasing cassette, the lock L15 is unlocked to enable a unit to be drawn out, the lock L16 is unlocked to enable pivotting of the quantity increasing cassette, the lock L17 is unlocked to enable access through a clerk cassette door, and the lock L18 is unlocked to enable access through a quantity increasing cassette door.

Fourth, electromagnetic locks L19 and L20 are respectively provided on the rear and front doors. The lock L19 is unlocked to enable access through the rear door, and the lock L20 is unlocked to enable access through a front door.

Figure 8:
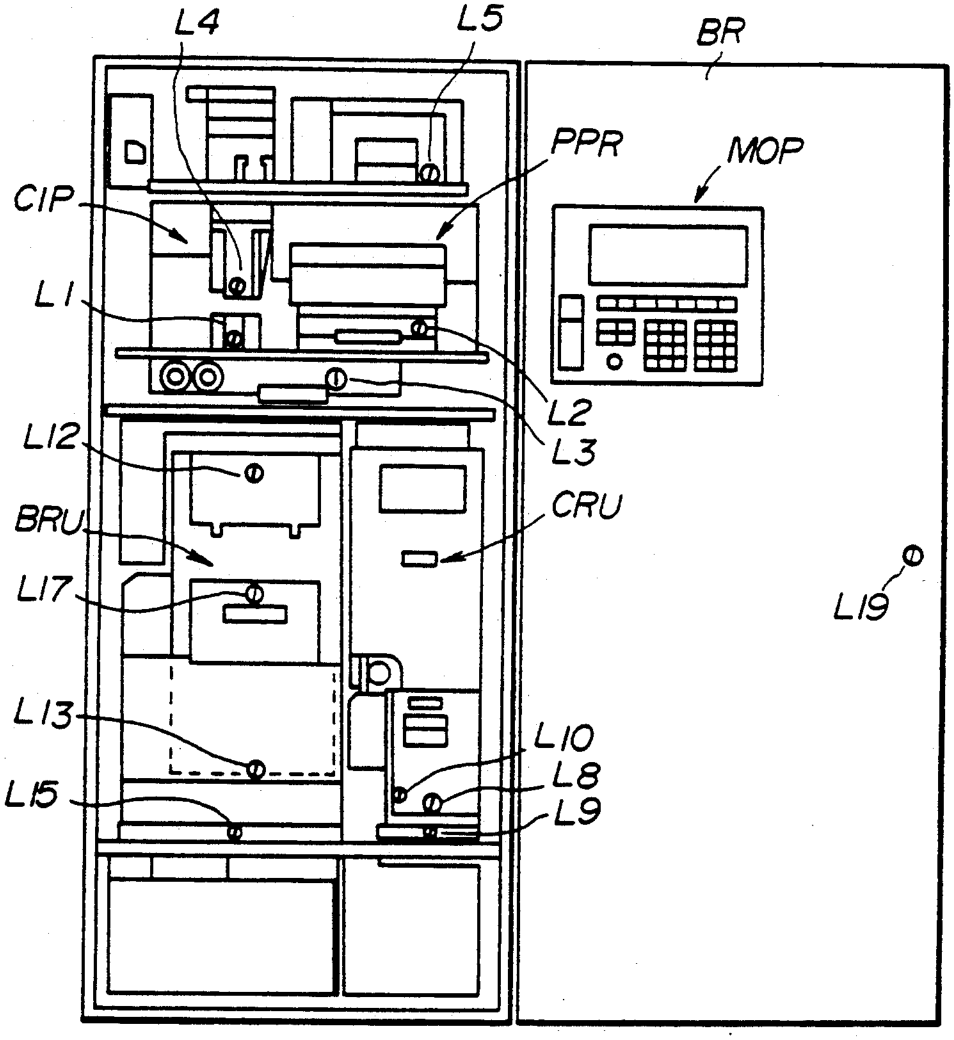
FIG. 8 is a front view showing the first embodiment with a rear door opened.
Figure 9:
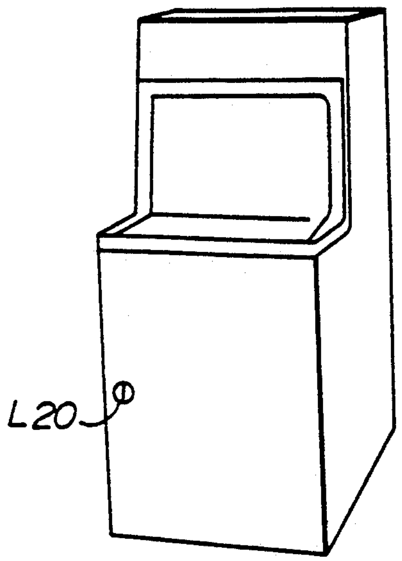
FIG. 9 is a perspective view showing the first embodiment.
Figure 10:
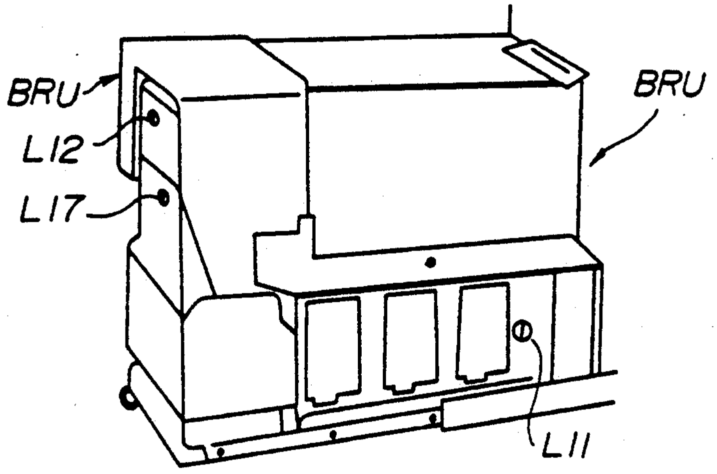
FIG. 10 is a perspective view generally showing a bill recycle unit which is drawn out from the banking terminal.
Figure 11:
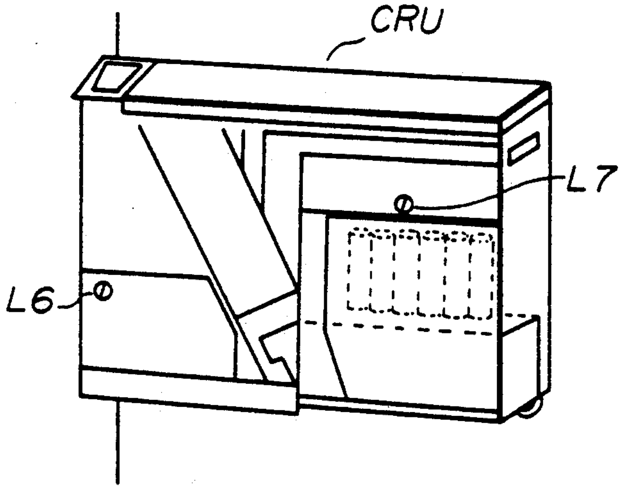
FIG. 11 is a perspective view generally showing a coin recycle unit which is drawn out from the banking terminal.

FIGS. 8 through 11 are diagrams for explaining the positions of the locks L1 through L13, L15, L17 and L18 through L20 in the banking terminal. FIG. 8 is a front view showing the first embodiment with a rear door BR opened, FIG. 9 is a perspective view of the first embodiment, FIG. 10 is a perspective view generally showing the bill recycle unit BRU which is drawn out from the banking terminal, and FIG. 11 is a perspective view generally showing the coin recycle unit CRU which is drawn out from the banking terminal. In FIGS. 8 through 11, the same designations are used as in the preceding figures.

Registering Format and Fixed Data in the ID Card

In order to write the required information in the ID card, it is necessary to register in advance the format of the ID cards and fixed data for checking whether or not each ID card is a genuine ID card issued by a particular bank. The information recorded on the ID card is divided into (i) variable information which is variable depending on the operator (the holder of the ID card), and (ii) fixed information which is used to check the authenticity of the ID card. With regard to the variable information, the format is registered by inputting the recording position of each item and its data length. On the other hand, with regard to the fixed information, the fixed data is registered by inputting the recording position of each item, the data length and the data.

If it is assumed that various items are recorded at predetermined positions of the ID card as shown in FIG. 12, for example, the operator ID, the operator level, the password and spare data 1 through n are the variable information. Hence, the format is registered by inputting the position and length of each item as shown in FIG. 13. By this format registration, it becomes possible to thereafter correctly read the variable information written on the ID card.

In addition, in FIG. 12, the ID mark, the bank approval, the first unused part, the bank arbitrary field and the second unused part are the fixed information. Thus, the fixed data is registered by inputting the position, length and data of each item as shown in FIG. 14. By this fixed data registration, it is possible to authenticate a predetermined ID card by checking whether or not the fixed information is recorded on the predetermined ID card when this predetermined ID card is inserted into the card reader to unlock the electromagnetic locks.

Figure 15:
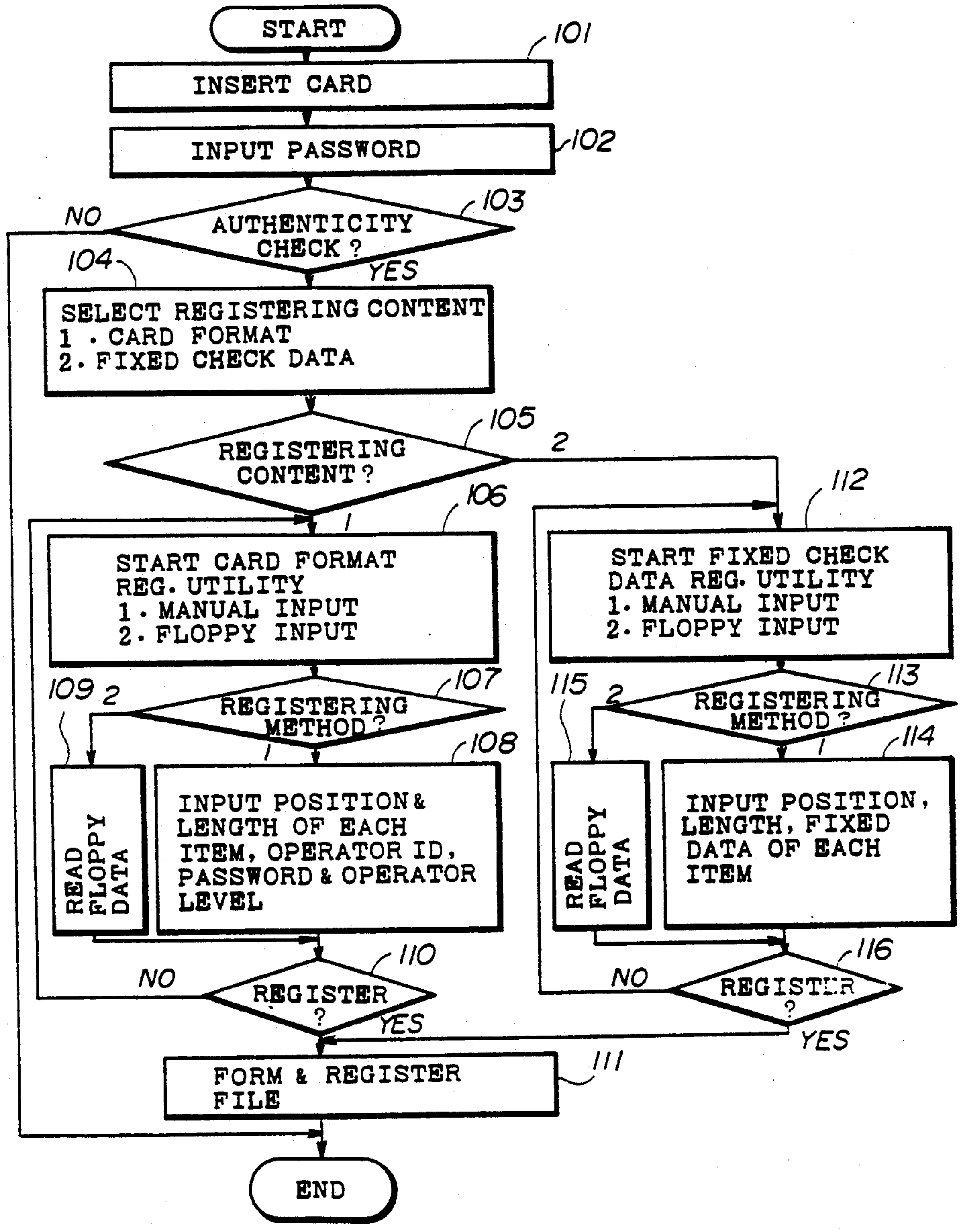
FIG. 15 is a flow chart for explaining a process of registering the ID card format and fixed check data.

FIG. 15 shows the process of registering the format and the fixed check data. First, a card for format registration is inserted into the card reader CDR of the maintenance operation panel MOP shown in FIG. 5 in a step 101 so that the card reader CDR reads the information on the inserted card. A personal ID number (password) is input in a step 102. Of course, the card may be inserted into the card reader of the card unit CIP.

The ID card system main control part CSCNT judges whether or not the password is authenticity in a step 103, and starts a registration utility if the judgement result in the step 103 is YES. The process ends if the judgement result in the step 103 is NO.

When the registration utility is started, the main control part CSCNT displays a selection menu related to the registering content on the display part DPY in a step 104. This selection menu displays "1. Registration of Card Format" and "2. Registration of Fixed Check Data".

The registering content is judged in a step 105 when the operator specifies the process by the menu number from the keyboard KBD. If the registration of the card format is selected, a card format registration utility is started and a selection menu related to the input method is thereafter displayed on the display part DPY in a step 106. This selection menu displays "1. Manual Input" and "2. Input via Floppy Disk".

When the operator specifies the input method by the menu number, the input method is judged in a step 107. If the manual input is selected, the position and length of each item are input in a step 108 together with the operator ID number, the password and the operator level. The data are read from the floppy disk in a step 109 if the input from the floppy disk is selected. The end of the registration is judged in a step 110, and the process returns to the step 106 if the judgement result in the step 110 is NO. On the other hand, if the judgement result in the step 110 is YES, a format file is formed and registered in the memory part MEM in a step 111 and the process ends.

On the other hand, if the registration of the fixed check data is selected in the step 104, a fixed check data registration utility is started and a selection menu related to the input method is thereafter displayed on the display part DPY in a step 112. This selection menu displays "1. Manual Input" and "2. Input via Floppy Disk".

When the operator specifies the input method by the menu number, the input method is judged in a step 113. If the manual input is selected, the position, length and fixed data of each item are input in a step 114. The data are read from the floppy disk in a step 115 if the input from the floppy disk is selected. The end of the registration is judged in a step 116, and the process returns to the step 112 if the judgement result in the step 116 is NO. On the other hand, if the judgement result in the step 116 is YES, a fixed check data file is formed and registered in the memory part MEM in the step 111 and the process ends.

The floppy disk is obtained by forming a card format file or a fixed data file using an editer function of a personal computer and storing the card format file or the fixed data file in the floppy disk.

The methods of registering the format and the fixed check data are not limited to those described in conjunction with FIG. 15. For example, the step 104 and the subsequent steps shown in FIG. 15 may be carried out after carrying out the following three steps. First, a start key is pushed after manipulating a master key so as to start a registration utility or, a key of the maintenance operation panel MOP or the user operation panel UOP is pushed to start the registration utility. Second, the personal ID number is input after inserting a registration card into the card reader CDR or the card unit CIP or, the personal ID number is simply input without the use of the registration card. Third, the step 104 and the subsequent steps are carried out if the authenticity check based on the input personal ID number reveals that the personal ID number is authentic.

When the registration of the format and the fixed check data described above ends, the ID card is issued by recording peculiar information (variable information) and the registered fixed check data on the ID card for each operator.

Registering Operator Information

When unlocking the electromagnetic lock using the ID card, it is necessary to register the operator information in advance as the operator information file in order to check the authenticity and validity of the ID card. The process of registering the operator information will now be given with reference to FIG. 16.

First, an operator information registration master card which is registered in advance is inserted into the card reader CDR of the maintenance operation panel MOP shown in FIG. 5 and the information is read in a step 201. The personal ID number (password) is input in a step 202. Of course, the master card may be inserted into the card reader of the card unit CIP.

The ID card system main control part CSCNT judges the authenticity of the password in a step 203, and the process ends if the judgement result in the step 203 is NO. On the other hand, if the judgement result in the step 203 is YES, an operator information file registration utility is started in a step 204.

When the operator information file registration utility is started, the main control part CSCNT displays a selection menu related to the input method on the display part DPY in the step 204. This selection menu displays "1. Read Card", "2. Manual Input", and "3. Input via Floppy Disk".

When the operator specifies the input method by the menu number, the input method is judged in a step 205 If the method "1. Read Card" is selected, the ID card in which the data are already written is inserted into the card reader CDR. The recorded data are read from the ID card in a step 206 so that predetermined data can be registered in the memory part MEM as the operator information. The operator information includes the operator ID, password, operator level, bank number, branch number and the like.

If the method "2. Manual Input" is selected, the operator information are input from the keyboard KBD in a step 207 so that the operator information can be registered in the memory part MEM.

Furthermore, if the method "3. Input via Floppy Disk" is selected, the operator information is input from the floppy disk in a step 208. The floppy disk may be obtained by forming the operator information file in advance using the editer function of the personal computer and storing the operator information file on the floppy disk.

After the step 206, a step 209 judges whether or not the registration is to be continued. The process returns to the step 206 if the judgement result in the step 209 is YES. Similarly, the step 209 judges whether or not the registration is to be continued after the step 207, and the process returns to the step 207 if the judgement result in the step 209 is YES.

On the other hand, if the judgement result in the step 209 is NO, a step 210 judges whether or not the registration of the input operator information is instructed. If the judgement result in the step 210 is NO, the process returns to the step 204 to repeat the steps 204 and after to input the operator information again. On the other hand, if the judgement result in the step 210 is YES, the input operator information is registered in the memory part MEM in a step 211 so as to form the operator information file, and the process of registering the operator information ends.

The operator information files shown in FIG. 17 are formed when the operator information is registered in the memory part MEM for each operator.

Figure 16:
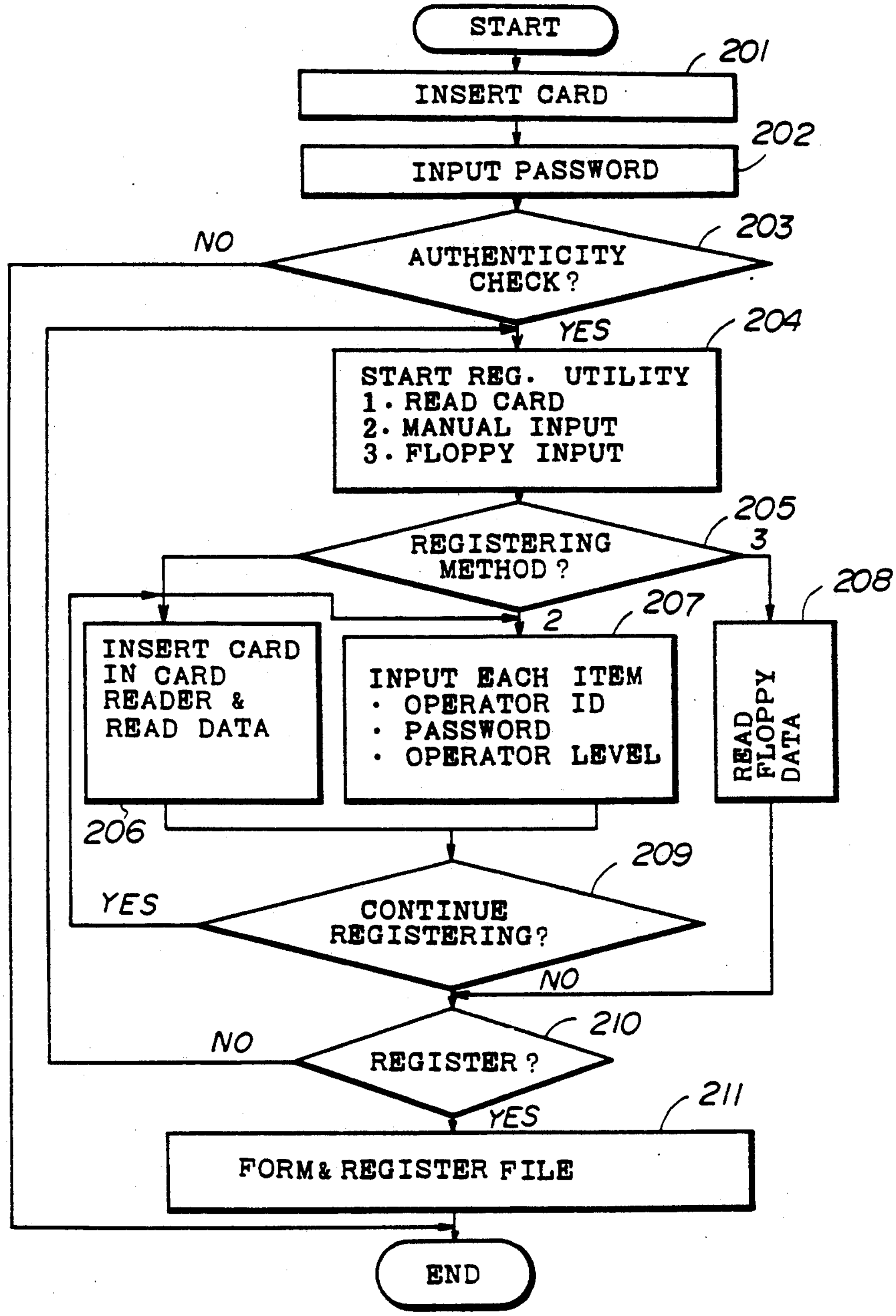
FIG. 16 is a flow chart for explaining a process of registering operator information.

The method of registering the operator information is not limited to that described in conjunction with FIG. 16. For example, the step 204 and the subsequent steps shown in FIG. 16 may be carried out after carrying out the following three steps. First, a key of the maintenance operation panel MOP or the user operation panel UOP is pushed to start the operator information registration utility. Second, the card data are read after inserting the operator information registration master card into the card reader CDR or the card unit CIP.. Third, the authenticity and validity of the card data are checked from the read data. Fourth, if the card data are valid, the password of the card is input, and the step 204 and the subsequent steps are carried out if the authenticity check based on the input password reveals that the password is authentic. OF course, a master key may be used in place of the operator information registration master card.

When unlocking the electromagnetic locks using the ID card, it may be unnecessary to make the password check for some operators. In this case, a "No Check" key of the keyboard KBD is pushed in the steps 206 through 208 in which the operator information is input, so that the password of the operator information file is registered as "FFFF" (free mode) even if the password exists on the ID card. In FIG. 17, "FFFF" indicating that the password check is unnecessary is registered if the operator level is the head or assistant head of the branch office.

On the other hand, when a 0 password card is used as the ID card, the password can be input in the step 206 of inputting the operator information to register the password in the operator information file, so that the password check is made when actually unlocking the electromagnetic lock even in the case of the 0 password card.

Table of Operator Level and Locks

In order to unlock predetermined electromagnetic locks using the ID card, it is necessary to register a table showing the correspondence of each operator level and one or more electromagnetic locks to be unlocked based on the position of each operator. This table is formed an input via the keyboard, the floppy disk or the like, and is registered in advance in the memory part MEM.

FIG. 18 shows the table showing the correspondence of the operator levels and the electromagnetic locks which may be unlocked using the ID card having the operator level. As shown, all the electromagnetic locks may be unlocked using the ID card of the head or assistant head of the branch office. Only the locks L19 and L3 respectively provided with respect to the rear door and the document output/card reader-writer DOC may be unlocked using the ID card of the part-time clerk. The locks L19 and L13 through L16 which need to be unlocked to draw out the cash cassette may be unlocked using the ID card of the third party such as the security company. The electromagnetic locks which may be unlocked using the ID cards of the managing, general and maintenance personnel are similarly stored in the memory part MEM. The electromagnetic locks which may be unlocked by each operator level may be selected arbitrarily or, the operator levels may be divided into finer levels, depending on the operation of each bank.

Process of Unlocking Locks Using ID Card

Figure 19:
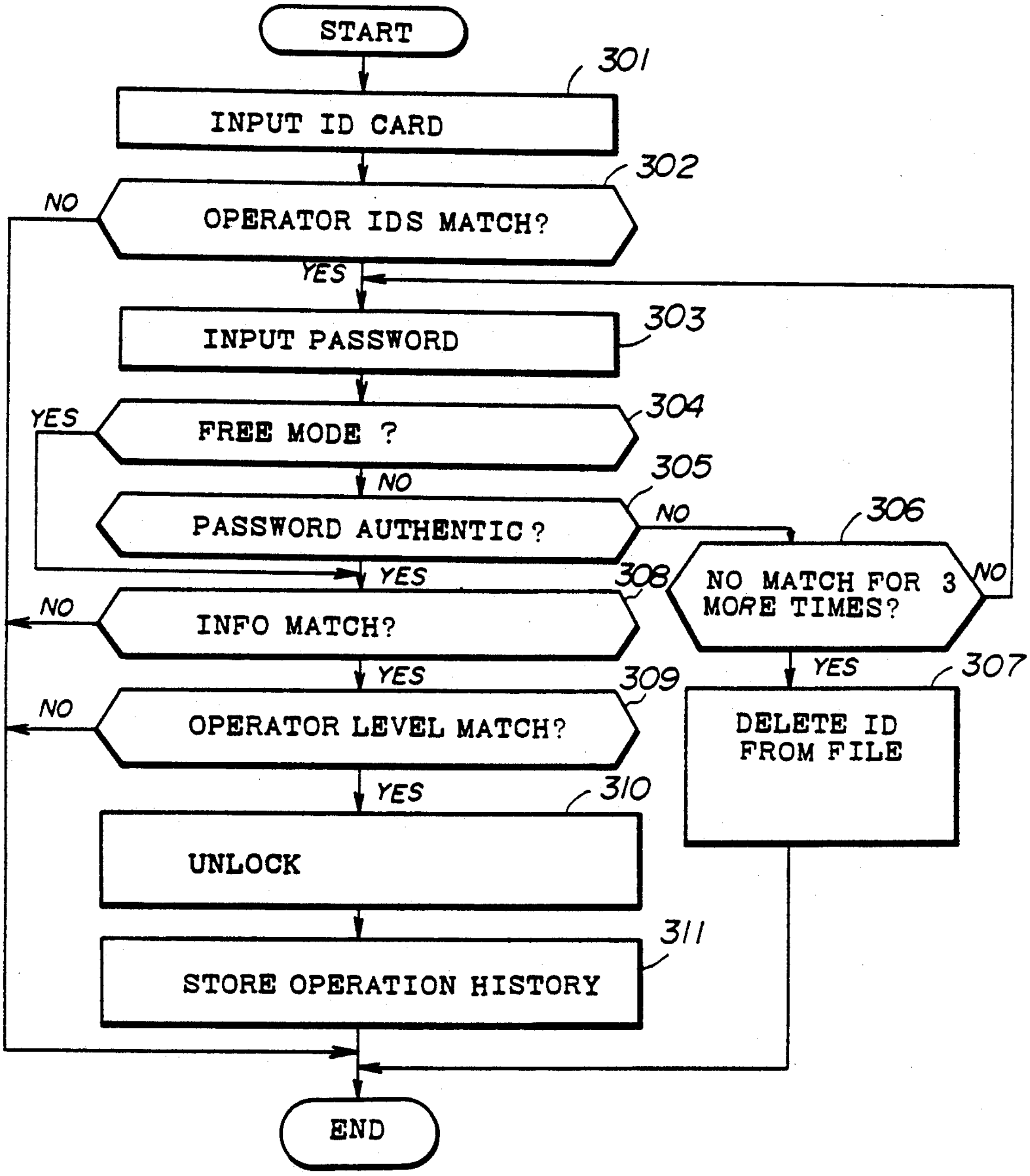
FIG. 19 is a flow chart for explaining a process of unlocking electromagnetic locks.

Next, a description will be given of the process of unlocking the electromagnetic locks using the ID card, by referring to FIG. 19. For the sake of convenience, it is assumed that the ID card format, the operator information file, the table which shows the correspondence of the operator level and one or more electromagnetic locks to be unlocked and the like are registered in the memory part MEM of the ID card system CDS.

When the operator makes a predetermined operation with respect to the banking terminal by unlocking predetermined electromagnetic locks, the operator inserts his ID card into the card reader CDR so that the recorded information on the ID card is read in a step 301.

The ID card system main control part CSCNT check in a step 302 whether or not the ID number read from the ID card matches the ID number which is registered in the operator information file. If the judgement result in the step 302 is NO, the ID card is ejected from the card reader CDR and the process ends. On the other hand, if the judgement result in the step 302 is YES, a message requesting input of the password is displayed on the display part DPY in a step 303 so that the operator inputs the password from the keyboard KBD.

When the password is input, the operator refers to the operator information file in a step 304 to judge whether or not the mode with respect to the password is the free mode. The authenticity of the input password is checked in a step 305 if the judgement result in the step 304 is NO. The authenticity of the password is checked as follows. First, if the password of the ID card is 0 (that is, a 0 password card), the input password and the password registered in the operator information file are collated. Second, if the password of the operator information file is 0, the input password and the password read from the ID card are collated. Third, if the password read from the ID card and the password registered in the operator information file are both not 0, the two passwords are collated, but if the two match, the input password and the password registered in the operator information file are collated.

If the passwords do not match, the password the input of the password is requested again. In other words, if the judgement result in the step 305 is NO, a step 306 judges whether or not the match is not obtained consecutively for three or more times. If the judgement result in the step 306 is YES, the operator ID is deleted from the operator information file in a step 307 and the process ends. On the other hand, the process returns to the step 303 if the judgement result in the step 306 is NO.

If the passwords match and the judgement result in the step 305 is YES or it is the free mode and the judgement result in the step 304 is YES, a check is made in a step 308 to judge whether or not the bank information next read from the ID card matches the bank information registered in the operator information file. The ID card is ejected and the process ends if the judgement result in the step 308 is NO.

On the other hand, if the collated bank information match and the judgement result in the step 308 is YES, a step 309 judges whether or not the operator level read from the ID card and the operator level registered in the operator information file match. The ID card is ejected and the process ends if the judgement result in the step 309 is NO.

If the collated operator levels match and the judgement result in the step 309 is YES, the one or more predetermined electromagnetic locks which are stored in correspondence with the operator level are read from the table and the predetermined magnetic locks are unlocked in a step 310. Thereafter, the year, month, day and time indicated by the calendar clock TIM, the ID number, the operation content (names of unlocked electromagnetic locks) and the like are written into the memory part MEM in a step 311 as operation history, and the process of unlocking the electromagnetic locks ends.

The operation history may be displayed on the display part DPY, printed on the journal paper, output to the floppy disk of the personal computer and the like if needed. In addition, the unlocked electromagnetic locks are locked after the predetermined operation is carried out with respect to the banking terminal and the operator extracts the ID card.

In the first embodiment described above, the electromagnetic locks to be unlocked are determined depending on the operator level (head, assistant head, managing position, general, part-time, third party, etc.) which is based on the position of the operator. However, in actual practice, the part of the banking terminal which may be handled may differ for the same operator level depending on the position in charge. For this reason, it is possible to include in the operator information file levels based on the operations (operation levels) such as the cash management, cash supply, medium supply, customer service, equipment supervision, maintenance and master, and to store the correspondence of the operation levels and the electromagnetic locks in the memory part MEM. In this case, predetermined electromagnetic locks corresponding to the operation level which is read from the ID card can be read from the memory part MEM and the predetermined electromagnetic locks may be unlocked.

Next, a description will be given of a second embodiment of the banking terminal according to the present invention. In FIG. 17, the part surrounded by a dotted line indicates an operation level item which is newly added to the operator information file in this second embodiment. FIG. 20 shows a table which shows the correspondence of one or more permitted operations with respect to each operation level and one or more predetermined electromagnetic locks which are unlocked for each operation level.

As shown in FIG. 20, if the operation level is (1) the master level, all electromagnetic locks may be unlocked. All operations other than the operations related to registration may be made and all electromagnetic locks may be unlocked in the cash management level (2). Electromagnetic locks which need to be unlocked in order to replace the cash cassette maybe unlocked in the cash supply level (3). Electromagnetic locks which need to be unlocked in order to supply a medium may be unlocked in the medium supply level (4). Electromagnetic locks which need to be unlocked in order to carry out operations such as eliminating fault, returning forgotten cash/medium and the like may be unlocked in the customer service level (5). Electromagnetic locks which need to be unlocked in order to supervise the state of the equipment may be unlocked in the equipment supervision level (6). In addition, electromagnetic locks which need to be unlocked in order to attend to the maintenance may be unlocked in the maintenance level (7).

In the embodiments described above, each file or table is stored in the memory part MEM of the ID card system CDS to control the electromagnetic locks. However, each file or table may be notified to a host or a terminal controller so that such information is managed in the host or terminal controller. In this case, it is easy to recover the information even if the information file or the like in the banking terminal is destroyed for some reason.

In addition, banking terminals which make planet/satellite connection may use the same operator information file. In this case, it is possible to manage the operator information file by loading into all of the satellite (sub) bank terminals the information which is registered or modified in the planet (parent) banking terminal.

Moreover, it is possible to connect a personal computer to the banking terminal and form various files and tables by the personal computer. It is also possible to manage the data and transfer the file or the like which is formed in the personal computer to the banking terminal to register such information into the banking terminal.

Figure 21:
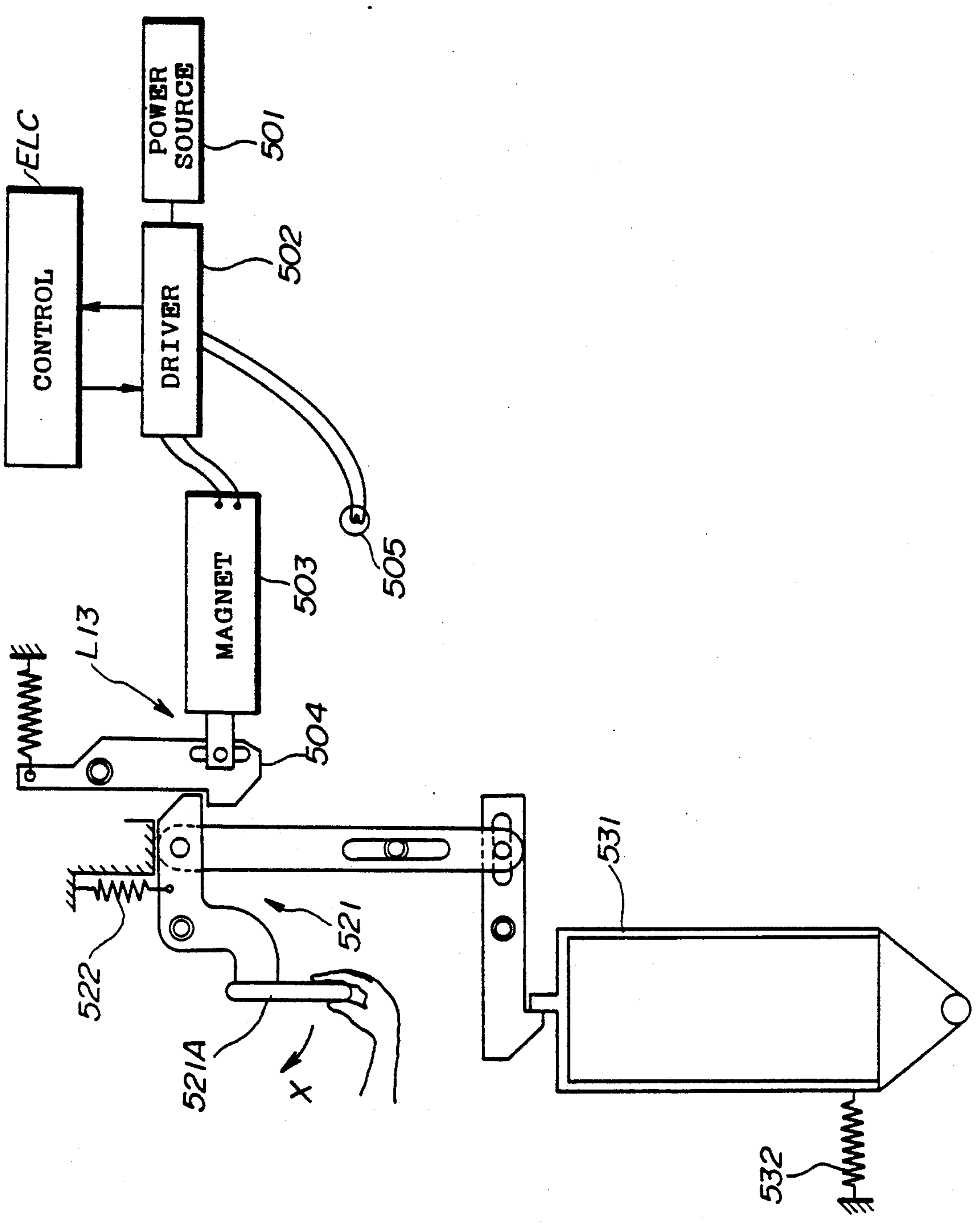
FIG. 21 is a diagram for explaining an electromagnetic lock in a locked state.

Next, a more detailed description will be given of the locking and unlocking of the electromagnetic locks. For the sake of convenience, a description will be given of the electromagnetic lock which is provided with respect to the bill recycle unit BRU. FIG. 21 shows the electromagnetic lock L13 in a locked state, and FIG. 22 shows the electromagnetic lock L13 in an unlocked state.

Figure 22:
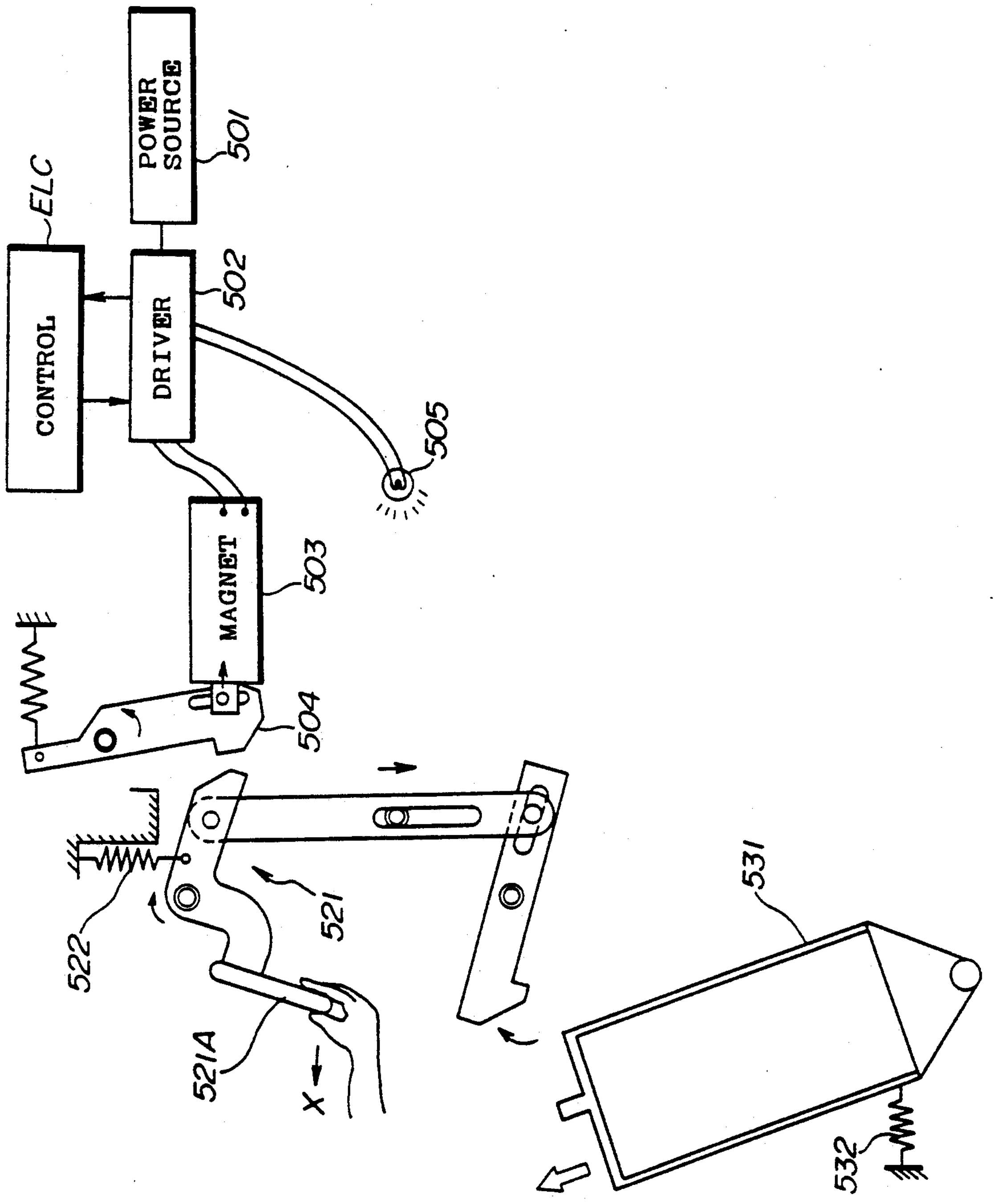
FIG. 22 is a diagram for explaining the electromagnetic lock in an unlocked state.

In FIGS. 21 and 22, a driver 502 drives an electromagnet 503 and a ready lamp 505 by a power source voltage supplied from a power source 501, in response to a control signal which is received from the electromagnetic lock control part ELC. The electromagnet 503 is connected to a lock mechanism 504 to form the electromagnetic lock L13.

In the locked state shown in FIG. 21, the electromagnet 503 and the ready lamp 505 are OFF, and a release lever 521A of a mechanism 521 is locked by the lock mechanism 504 and cannot be pulled in a direction X. Hence, a cassette holder 531 is locked by the mechanism 521 and cannot be pivotted, that is, the cassette holder 531 cannot be drawn out of the bill recycle unit BRU.

On the other hand, when the driver 502 receives an unlock instruction from the control part ELC, the electromagnet 503 is turned ON to pull on the lock mechanism 504 and the ready lamp 505 is turned ON to indicate the unlocked state of the electromagnetic lock L13. In this state shown in FIG. 22, the release lever 521A can be pulled in the direction X. When the release lever 521A is pulled in the direction X, the mechanism undergoes a displacement as shown, and the cassette holder 531 is pivotted counterclockwise by the action of a spring 532. As a result, the cassette holder 531 can be drawn out of the bill recycle unit BRU.

When the operator removes the cassette holder 531 and lets go of the release lever 521A, the mechanism 521 returns to its original state shown in FIG. 21 by the action of a spring 522, and the electromagnetic lock L13 automatically returns to the locked state. In this state, a new cassette holder 531 can be set into the bitt recycle unit BRU, and the new casette holder 531 is automatically locked in position when set and pivotted clockwise.

If the release lever 521A is not pulled within a predetermined time in the unlocked state shown in FIG. 22, measures may be taken so that the electromagnetic lock L13 automatically returns to the locked state shown in FIG. 21.

Figure 23:
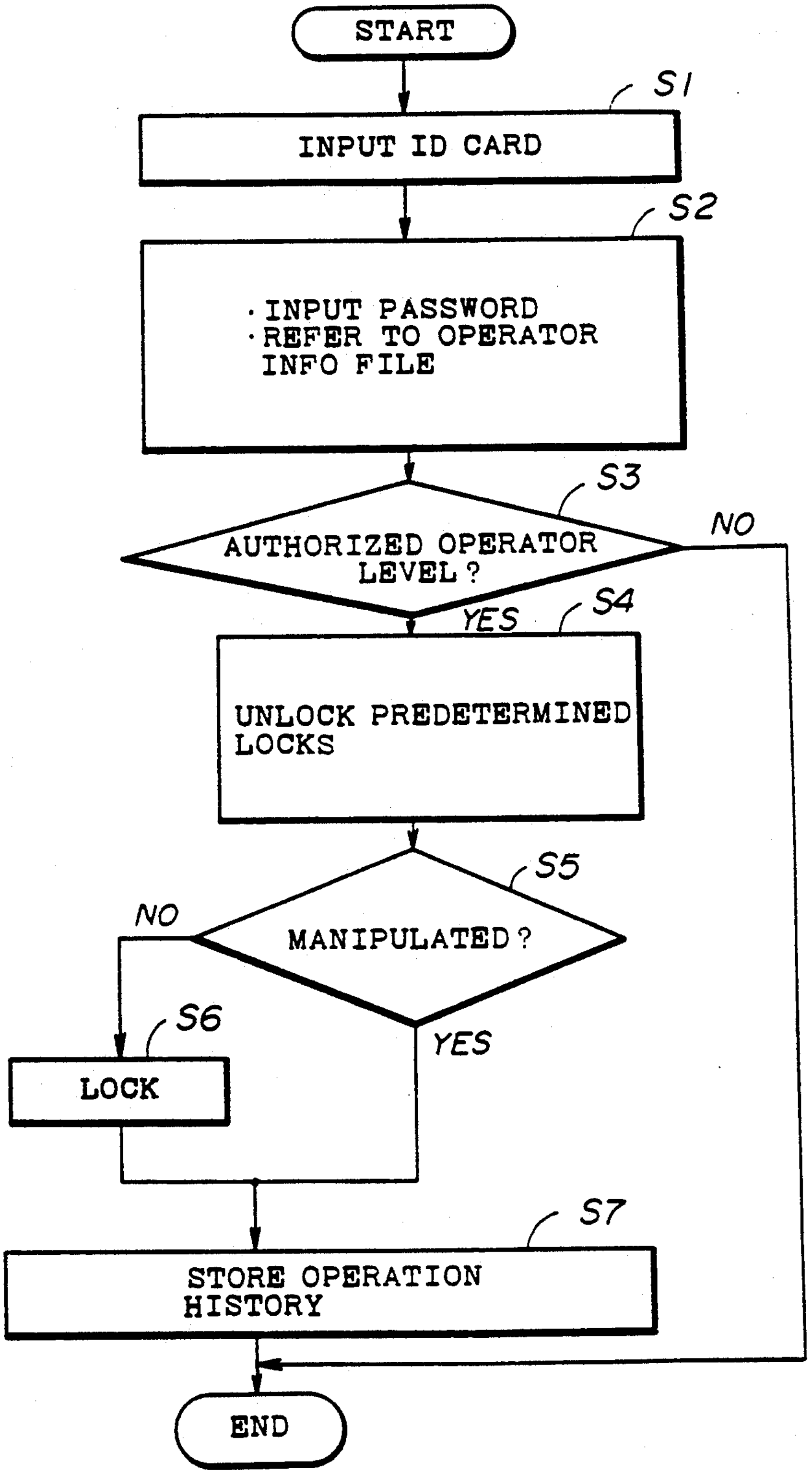
FIG. 23 is a flow chart for explaining a control of the electromagnetic locks.

FIG. 23 is a flow chart for explaining the control of the electromagnetic locks. For the sake of convenience, it is assumed that the electromagnetic lock L13 is controlled. In FIG. 23, an ID card is inserted into the card reader CDR and the data are read from the ID card in a step S1. The password is input and the reference is made to the operator information file in a step S2, similarly as in the case shown in FIG. 19 described above. The operator level is checked in a step S3. The process ends if the operator level has no authority to unlock the electromagnetic locks.

On the other hand, if the judgement result in the step S3 is YES, predetermined electromagnetic locks corresponding to the operator level are unlocked in a step S4. A step S5 judges whether or not an operation is made in respect of the predetermined electromagnetic locks which are unlocked. For example, the step S5 judges whether or not the release lever 521A is pulled within a predetermined time. If the release lever 521A is not pulled within the predetermined time and the judgement result in the step S5 is NO, a step S6 locks the predetermined electromagnetic locks which were unlocked. If the judgement result in the step S5 is YES or after the step S6, the operation history is stored in the memory part MEM in a step S7, and the process ends.

Next, a description will be given of another control of the electromagnetic locks, by referring to FIG. 24. In this case, the predetermined electromagnetic locks are unlocked in a predetermined sequence. For the sake of convenience, it is assumed that the predetermined magnetic locks are unlocked to open the stacker of the bill recycle unit BRU.

Figure 24:
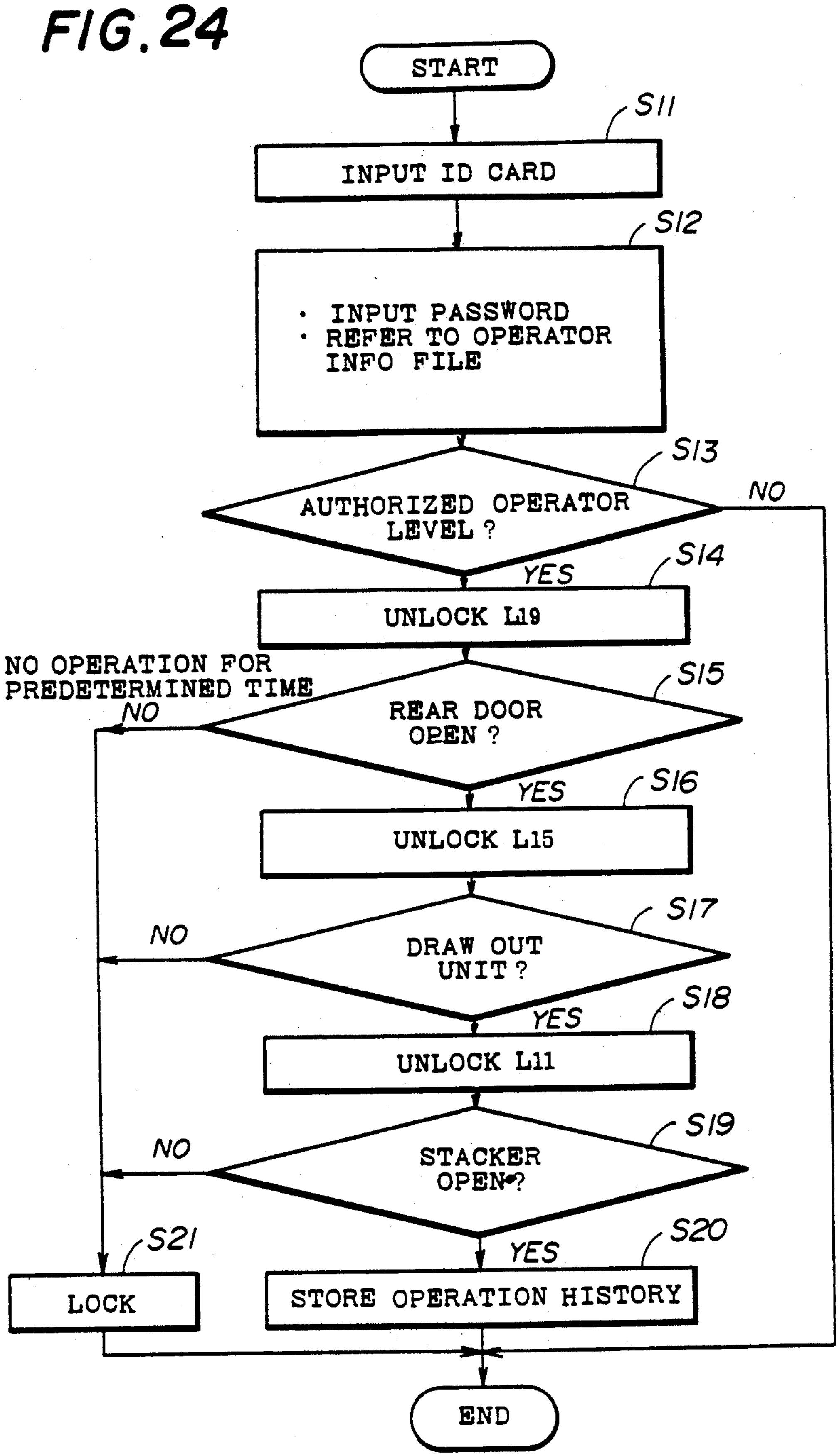
FIG. 24 is a flow chart for explaining another control of the electromagnetic locks.

In FIG. 24, an ID card is inserted into the card reader CDR and the data are read from the ID card in a step S11. The password is input and the reference is made to the operator information file in a step S12, similarly as in the case shown in FIG. 19 described above. The operator level is checked in a step S13. The process ends if the operator level has no authority to unlock the electromagnetic locks.

On the other hand, if the judgement result in the step S13 is YES, the electromagnetic lock L19 of the rear door is unlocked in a step S14, and a step S15 judges whether or not the rear door is opened within a predetermined time. If the judgement result in the step S15 is YES, the electromagnetic lock L15 for drawing out the unit is unlocked in a step S16, and a step S17 judges whether or not the unit is drawn out within a predetermined time. If the judgement result in the step S17 is YES, the electromagnetic lock L11 of the stacker is unlocked in a step S18, and a step 19 judges whether or not the stacker is opened within a predetermined time. The operation history is stored in the memory part MEM in a step S20 if the judgement result in the step S19 is YES, and the process ends. On the other hand, if the judgement result in any one of the steps S15, S17 and S19 is NO, the unlocked electromagnetic locks in a step S21, and the process ends.

Therefore, the electromagnetic locks are not all unlocked at the same time depending on the operator level, and the electromagnetic locks are sequentially unlocked depending on the progress of the operation.

In FIGS. 23 and 24, the steps S5, S15, S17 and S19 judge whether or not the related parts have been manipulated. Such judgements may be made by the control part ELC which receives a status signal from each of sensors via a sensor receiver shown in FIG. 25.

Figure 25:
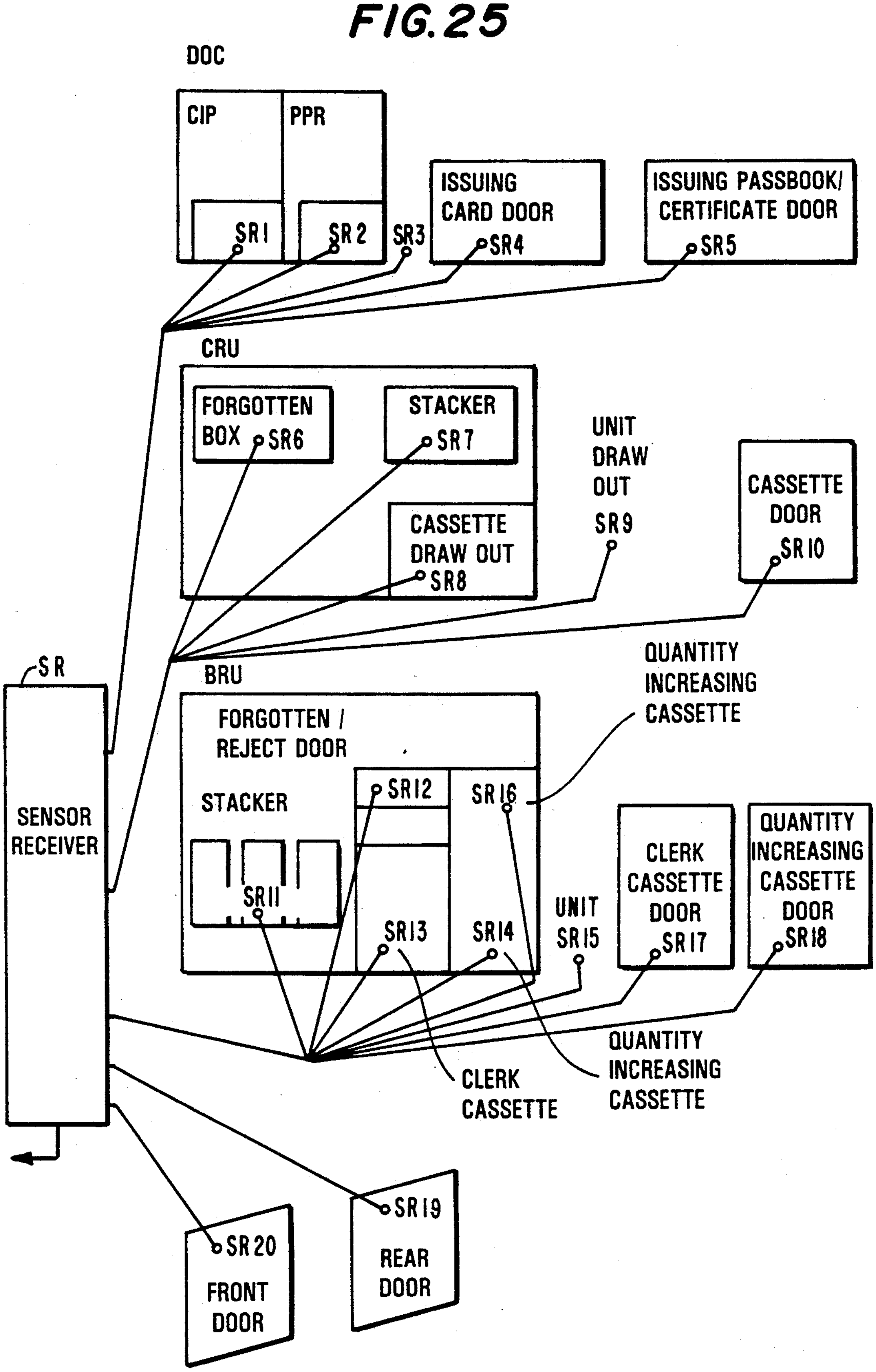
FIG. 25 is a diagram for explaining positions of sensors.

In FIG. 25, those parts which are the same as those corresponding parts in FIG. 7 are designated by the same reference numerals, and a description thereof will be omitted. As shown in FIG. 25, sensors SR1 through SR20 are respectively provided with respect to the electromagnetic locks L1 through L20. Each sensor outputs a status signal which indicates whether or not the part to which the corresponding electromagnetic lock is provided has been manipulated. The status signals from each of the sensors SR1 through SR20 are supplied to the control part ELC via a sensor receiver SR. Hence, the control part ELC can make the judgements in the steps S5, S15, S17 and S19 based on the status signals from the sensor receiver SR.

On the other hand, in the steps S3 and S13 shown in FIGS.23 and 24, it is also possible to check the operation state of the banking terminal in addition to the operator level. The operation state of the banking terminal may one of idle, transacting, fault processing and out of operation states for example. In addition, unlocking conditions may be input from the maintenance operation panel MOP. Therefore, the electromagnetic locks which are to be unlocked may be determined from an arbitrary combination of the operator level and the operation state of the banking terminal and/or the unlocking conditions input from the maintenance operation panel MOP.

Figure 26:
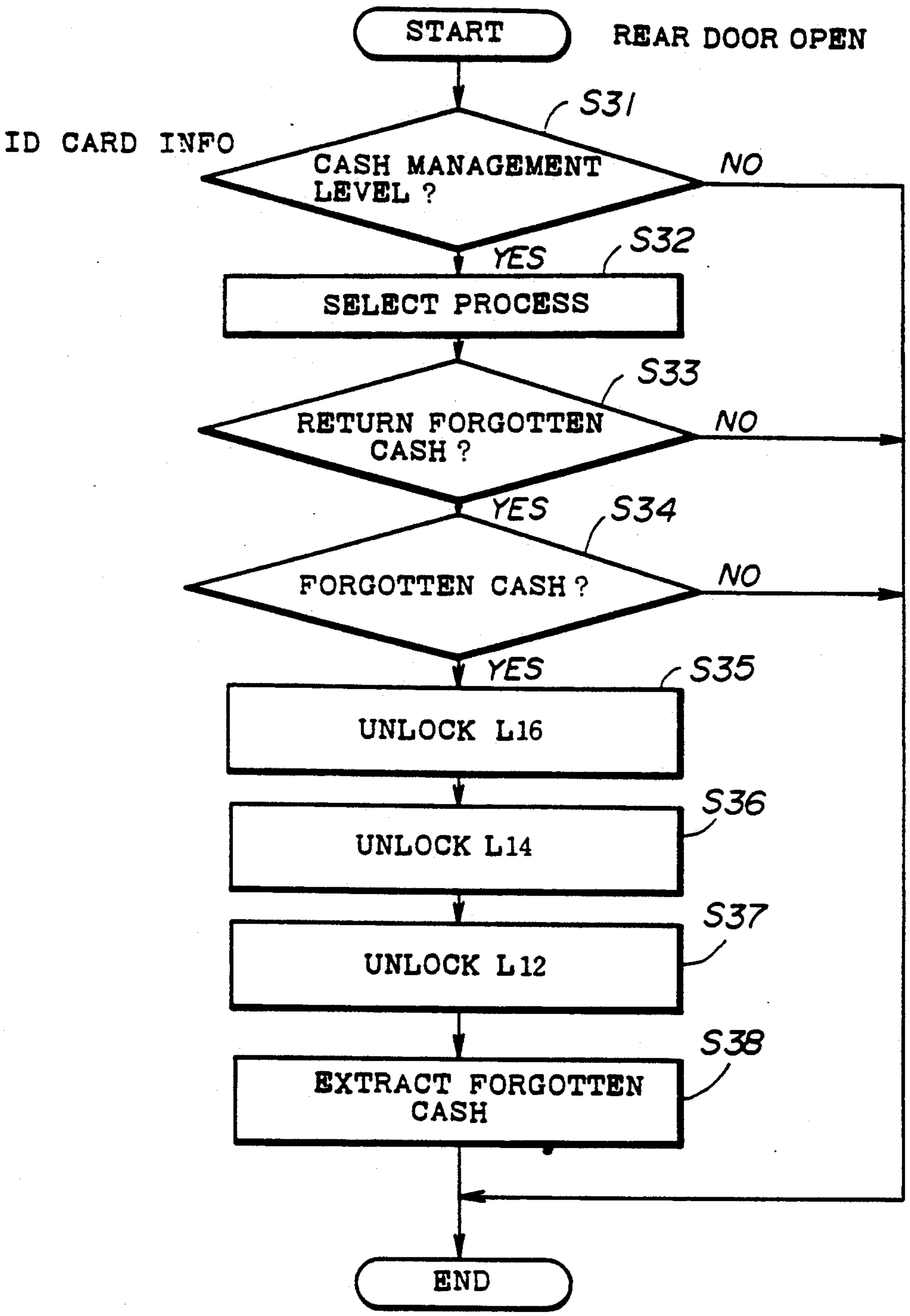
FIG. 26 is a flow chart for explaining a process of returning forgotten cash.
Figure 27:
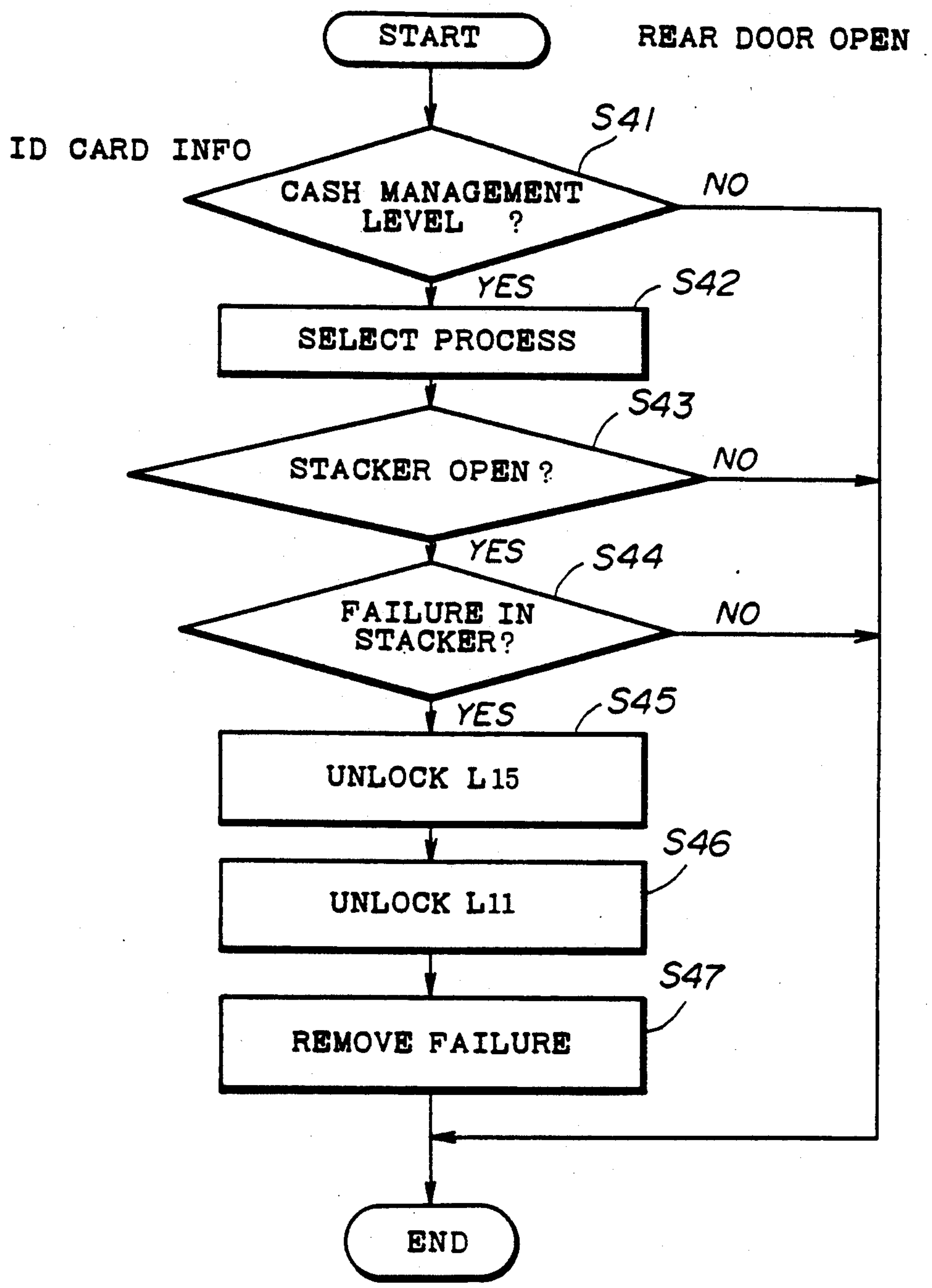
FIG. 27 is a flow chart for explaining a process of removing a failure within a stacker.

Next, a description will be given of particular applications of the present invention, by referring to FIGS. 26 and 27. FIG. 26 shows a process of returning forgotten cash, and FIG. 27 shows a process of removing a failure within a stacker.

The customer may forget to take the cash when he draws out from his account using the bank terminal, and then report this to the bank. In this case, the process shown in FIG. 26 is started in the state where the rear door is open if the forgotten cash are bills. A step S31 judges whether or not the operator is authorized to handle cash based on the information read from the ID card. The process ends if the judgement result in the step S31 is NO.

But if the judgement result in the step S31 is YES, the clerk operation is selected in a step S32. A step S33 judges whether or not the selected clerk process is the process of returning the forgotten cash. A step S34 judges whether or not forgotten cash exists. The process ends if the judgement result in the step S33 or S34 is NO.

On the other hand, if the judgement result in the step S34 is YES, the electromagnetic lock L16 shown in FIG. 7 is unlocked in a step S35 so that the quantity increasing cassette can be pivotted. The electromagnetic lock L14 is unlocked in a step S36 so that the quantity increasing cassette can be drawn out of the banking terminal. The electromagnetic lock L12 is unlocked in a step S37 so that the forgotten/reject door can be opened. Then, the forgotten cash (bills) are extracted in a step S38, and the process ends.

Of course, if no forgotten cash exists, it is possible to mask the steps S32 through S34 so that the selection menu for the process of returning forgotten cash will not be selected.

The mechanism for feeding out the bills may fail within the stacker. In this case, the process shown in FIG. 27 is started in the state where the rear door is open. A step S41 judges whether or not the operator is authorized to handle cash based on the information read from the ID card. The process ends if the judgement result in the step S41 is NO.

But if the judgement result in the step S41 is YES, the clerk operation is selected in a step S42. A step S43 judges whether or not the selected clerk process is the process of removing the failure within the stacker. A step S44 judges whether or not a failure exists within the stacker. The process ends if the judgement result in the step S43 or S44 is NO.

On the other hand, if the judgement result in the step S44 is YES, the electromagnetic lock L15 shown in FIG. 7 is unlocked in a step S45 so that the bill recycle unit BRU can be drawn out from the banking terminal. The electromagnetic lock L11 is unlocked in a step S46 so that the stacker can be opened and an access to the stacker can be made. Then, the failure within the stacker is removed in a step S47, and the process ends.

Therefore, according to the present invention, no keys are necessary and there is no need to make a complex key management. In addition, the locks can be unlocked by a simple operation, and the operation of the banking terminal can be finely controlled depending on the operator level, the operation level and the like. It is easy to cope with the situation even if the number of locks becomes large.

On the other hand, the use of the electromagnetic locks enables central control by a host and the like, and the cost for making various kinds of keys is also eliminated.

By making a password correspond to each ID card, it is also possible to include the correct input of the password as one of the conditions for unlocking one or more predetermined locks. The security system is improved by registering the information stored in each ID card into the banking terminal in advance as operator files and unlocking one or more predetermined locks only if predetermined data within the information read from the ID card matches the corresponding data of the operator file or, using the match of the data as one of the conditions for unlocking the predetermined locks.

Moreover, the security can also be improved by storing the operation history of the banking terminal using the ID card, so that the operation history can be output arbitrarily.

Further, the present invention is not limited to these embodiments, but various variations and modifications may be made without departing from the scope of the present invention.

What is claimed is:

1. A banking terminal comprising:

a plurality of locks provided at predetermined parts of the banking terminal and unlocked in response to instruction signals;

memory means for storing a table of attribute data in correspondence with one or a plurality of locks which are to be unlocked, the attribute data indicating levels of operations which are to be carried out with respect to the banking terminal;

reading means for reading information from a identification card which prestores at least attribute data; and control means, coupled to said locks, said memory means and said reading means, for automatically unlocking one or a plurality of predetermined locks out of said locks by supplying instruction signals based on the attribute data read from the identification card by said reading means by referring to the table of said memory means.

2. The banking terminal as claimed in claim 1, wherein each identification card prestores one password, said banking terminal further comprises input means for inputting a password, and said control means includes means for collating the password read from the identification card by said reading means and the password input from said input means and for supplying the instruction signals to the predetermined locks only if the passwords match.

3. The banking terminal as claimed in claim 1, wherein said memory means prestores predetermined information within the information stored in each identification card in a form of an operator information file, and said control means includes means for collating predetermined data read from the identification card by said reading means and corresponding data of the operator information file and for supplying the instruction signals to the predetermined locks only if the data match.

4. The banking terminal as claimed in claim 1, wherein said memory means stores a history of operations carried out using the identification card, and said banking terminal further comprises output means for outputting the history stored in said memory means at an arbitrary time.

5. The banking terminal as claimed in claim 1, wherein the attribute data indicates levels of operators who carry out operations with respect to the banking terminal.

6. The banking terminal as claimed in claim 1, which further comprises notifying means for notifying an operation state of the banking terminal to said control means, and said control means supplies the instruction signals to the predetermined locks depending on the operation state of the banking terminal.

7. The banking terminal as claimed in claim 6, wherein said notifying means includes a plurality of sensors respectively provided at the predetermined parts of the banking terminal in correspondence with the locks for sensing an operation carried out with respect to each of the predetermined parts.

8. The banking terminal as claimed in claim 1, wherein said control means includes means for automatically supplying an instruction signal to an arbitrary lock which is unlocked so as to lock the arbitrary lock after the arbitrary lock is unlocked for a predetermined time.

9. The banking terminal as claimed in claim 1, wherein said control means includes means for supplying the instruction signals to the predetermined locks so that the predetermined locks are unlocked in a predetermined sequence.

10. The banking terminal as claimed in claim 9, wherein said control means further includes means for automatically supplying an instruction signal to an arbitrary lock which is unlocked so as to lock the arbitrary lock after the arbitrary lock is unlocked for a predetermined time.

11. The banking terminal as claimed in claim 1, wherein said locks are electromagnetic locks.

12. A banking terminal for use with a card, comprising:

a plurality of locks arranged at predetermined locations of the banking terminal;

a memory storing plural attribute data, each of the plural attribute data corresponding to a group of the plurality of locks which must be opened to perform a predetermined banking terminal operation;

a card reader for reading attribute data from the card; and a controller coupled to the plurality of locks, the memory and the card reader, for unlocking the group of the plurality of locks based on the attribute data read from the card and used to access the memory to determine the group of the plurality of locks to be opened.

* * * * *

UNITED STATES PATENT AND TRADEMARK OFFICE

CERTIFICATE OF CORRECTION

PATENT NO. : 5,286,954

DATED : February 15, 1994

INVENTOR(S) : Yukie SATO et al.

It is certified that error appears in the above-indentified patent and that said Letters Patent is hereby corrected as shown below:

On the cover page, [57] Abstract, line 7, change "a" to --an--.

Col. 2, line 23, change "5)" to --(5)--.

Col. 3, line 18, change "a" to --an--;
line 68, change "I" to --ID--.

Col. 4, line 43, delete "an".

Col. 6, line 29, after "System" insert --:--;
line 65, after "Locks" insert --:--.

Col. 7, line 10, change "a" to --an--;
line 12, change "a" to --an--;
line 51, after "Card" insert --:--.

UNITED STATES PATENT AND TRADEMARK OFFICE
CERTIFICATE OF CORRECTION

PATENT NO. : 5,286,954
DATED : February 15, 1994
INVENTOR(S) : Yukie SATO et al.

It is certified that error appears in the above-indentified patent and that said Letters Patent is hereby corrected as shown below:

Col. 9, line 35, after "Information" insert --:--.

Col. 10, line 44, change "CIP.." to --CIP.--;
line 50, change "OF" to --Of--.

Col. 11, line 3, after "Locks" insert --:--;
line 31, after "Card" insert --:--.

Col. 17, line 19, change "a" to --an--.

Signed and Sealed this
Sixth Day of September, 1994

Attest:

BRUCE LEHMAN

Attesting Officer

Commissioner of Patents and Trademarks